United States Patent
Zhang et al.

(10) Patent No.: US 12,341,869 B2
(45) Date of Patent: Jun. 24, 2025

(54) METHOD FOR ENCRYPTING VISUALLY SECURE IMAGE

(71) Applicant: DALIAN UNIVERSITY, Dalian (CN)

(72) Inventors: Qiang Zhang, Dalian (CN); Bin Wang, Dalian (CN); YuanDi Shi, Dalian (CN); XiaoPeng Wei, Dalian (CN)

(73) Assignee: DALIAN UNIVERSITY, Liaoning (CN)

( * ) Notice: Subject to any disclaimer, the term of this patent is extended or adjusted under 35 U.S.C. 154(b) by 140 days.

(21) Appl. No.: 18/497,059

(22) Filed: Oct. 30, 2023

(65) Prior Publication Data
US 2024/0137207 A1    Apr. 25, 2024

Related U.S. Application Data

(63) Continuation of application No. PCT/CN2023/117592, filed on Sep. 8, 2023.

(30) Foreign Application Priority Data

Sep. 19, 2022 (CN) .......................... 202211168486.0

(51) Int. Cl.
    H04L 9/06    (2006.01)
(52) U.S. Cl.
    CPC .......... H04L 9/0618 (2013.01); H04L 9/0643 (2013.01)
(58) Field of Classification Search
    CPC ..... H04L 9/0618; H04L 9/0643; H04L 9/001; G09C 5/00; G06F 17/16; G06F 17/18; G06F 21/602; G06T 9/00
    See application file for complete search history.

(56) References Cited

FOREIGN PATENT DOCUMENTS

| CN | 106971114 A | 7/2017 |
|----|-------------|--------|
| CN | 107578363 A | 1/2018 |

(Continued)

OTHER PUBLICATIONS

"Chunyang Sun , Erfu Wang and Bing Zhao; Image Encryption Scheme with Compressed Sensing Based on a New Six-Dimensional Non-Degenerate Discrete Hyperchaotic System and Plaintext-Related Scrambling; FEb. 27, 2021, entropy, 25 pages" (Year: 2021).*

*Primary Examiner* — Mohammed Waliullah
(74) *Attorney, Agent, or Firm* — Ming Jiang; OPENPTO US LLC

(57) ABSTRACT

The present disclosure discloses a method for encrypting a visually secure image based on adaptive block compressed sensing and non-negative matrix decomposition. Firstly, the Tetrolet transform is performed on the plain image, then the sparsity degree is optimized on the sparsity matrix and the matrix scrambling is performed, such that the sparsity degree in each block region of the image matrix is equalized. Then according to the image information, the sampling number of the block region is calculated, the measurement matrix is constructed and optimized, and the image is compressed by using the optimized measurement matrix. The compressed image is then scrambled and diffused to complete the encryption process. Finally, the image information is embedded into the carrier image through non-negative matrix decomposition to obtain a visually safe ciphertext image. The decryption process is the inverse of the encryption process.

9 Claims, 8 Drawing Sheets

(56) References Cited

FOREIGN PATENT DOCUMENTS

| CN | 112084513 | A | | 12/2020 | | |
|---|---|---|---|---|---|---|
| CN | 113890722 | A | * | 1/2022 | ............. | H04L 9/001 |
| CN | 115442492 | A | | 12/2022 | | |

* cited by examiner

| 1-1 | 2 | 3 | 4 | 5 | 6 |
|---|---|---|---|---|---|
| _ll__ll | _____ | lllllll | ___l___l | ll_lll_l | _l__l__ |
| 7 | 8 | 9 | 10 | 11 | 12 |
| _llll_ll | l_l____ | _ll____ | ___l_l_ | ___l_l_ | ll_lll_l |
| 13 | 14 | 15 | 16-1 | 1-2 | 16-2 |
| _lllll_ | lll_l_l | ll_lll_ | _lll_l_ | ll_ll__ | _l__l_ |

FIG. 4

METHOD FOR ENCRYPTING VISUALLY SECURE IMAGE

CROSS-REFERENCE TO RELATED APPLICATIONS

The present application claims priority to Chinese Patent Application No. 202211168486.0, entitled "METHOD FOR ENCRYPTING VISUALLY SECURE IMAGE", filed on Sep. 19, 2022 before China National Intellectual Property Administration, the entire contents of which are incorporated herein by reference.

TECHNICAL FIELD

The present disclosure relates to the technical field of compressed sensing and image encryption, and in particular to a method for encrypting a visually secure image lased on adaptive block compressed sensing and non-negative matrix decomposition.

BACKGROUND

In recent years, image encryption technology has become more and more mature, especially in combination with compression technology, can greatly reduce the transmission and storage space, while ensuring information security kind relieving the pressure of signal transmission. Image compression based on block compressed sensing is one of the hot research directions in recent years. Since this type of method can site the operation Object from the whole image matrix to a single image block matrix, it greatly saves storage space and computational complexity, thus greatly improving the practicality. However, it is difficult to determine the appropriate sparsity of the image, use a fixed sampling rate and unable to construct an appropriate measurement matrix such that the encryption method based on the traditional block compressed sensing theory can not achieve good results, which has become three issues to be solved urgently in this field, and is also our main research direction. In addition, attackers are faced with a wide variety of attacks, making more and more pure image encryption methods unable to eliminate the risk of betty cracked. Therefore, some encryption methods based on visual security are proposed successively, namely, the ciphertext image containing secret information is only a natural image visually, such that the attacker's attention is not aroused and the risk of being cracked is reduced. Non-negative matrix decomposition (NMD) is a widely used data processing tool in the field of signal processing. The non-negative limitation of non-negative matrix decomposition results in the sparsity of the corresponding description to a certain extent, which makes the description of data convenient and reasonable, and at the same time can suppress the influence of external interference factors on data feature extraction to a certain extent. Therefore, the non-negative matrix decomposition has the advantages of simplicity in implementation, interpretability in decomposition form and decomposition result, and less storage space, which provides a new idea for information hiding.

SUMMARY

In order to overcome the shortcomings of the prior art, the present disclosure proposes a method for encrypting a visually secure image based on adaptive block compressed sensing and non-negative matrix decomposition, improves the traditional block compressed sensing theory, designs a new adaptive block compressed sensing method, and designs a new scrambling and diffusion algorithm by using the four-grid puzzle generated in the process of Tetrolet transformation. Finally, a new information hiding method is realized by using non-negative matrix decomposition, and a ciphertext image with better encryption effect and a decrypted image with better decryption effect are obtained.

The technical solution adopted by the present disclosure to solve the technical issue thereof is described in the following content: a method for encrypting a visually secure image, including the steps of:

generating parameters and initial values of a six-dimensional hyperchaotic system and a hybrid chaotic system according to plaintext image information; generating a chaotic sequence by iteration of the six-dimensional hyperchaotic system, and constructing a random sequence using the generated chaotic sequence; performing Tetrolet transformation on the plaintext image to generate a coefficient matrix and performing optimized matrix scrambling for the coefficient matrix; regarding a scrambled coefficient matrix, calculating a quantity of samplings allocated to each block after the coefficient matrix is divided into blocks according to a block sampling strategy based on region energy; generating the chaotic sequence by iteration of the hybrid chaotic system, conducting an initial measurement matrix using the generated chaotic sequence, and obtaining a final measurement matrix by optimizing arid normalizing the initial measurement matrix; according to the block compressed sensing theory, using the block measurement matrix to measure a corresponding block coefficient matrix, and obtaining the measurement value matrix; quantizing the measurement value matrix to obtain a quantized measurement value matrix; scrambling a quantized measurement value matrix at pixel level by scrambling method based on domino tile issue, and obtaining the measurement value matrix after a first scrambling; scrambling the measurement value matrix at pixel level after the first scrambling by the scrambling method based on domino overturn issue, and obtaining the measurement value matrix after a second scrambling; diffusing the measurement value matrix after the second scrambling using a diffusion method based on a four-grid puzzle to obtain a diffused measurement value matrix, and performing a reverse diffusion operation on the diffused measurement value matrix to obtain a secret image matrix embedding the secret image matrix into a carrier image using non-negative matrix decomposition to obtain a ciphertext image.

The present disclosure has advantages over existing methods in the following aspects.

Instead of setting a fixed quantity of samplings for each block of an image, the sampling process is adaptive to the image information, and an adaptive block sampling strategy based on region energy is proposed, such that the quantity of samplings in a Hock can be allocated more reasonably. The construction process of the measurement matrix is optimized, and according to the contribution value of the image coefficient to the signal recovery, the proportion of the large coefficient is increased or the proportion, of the coefficient is decreased, so as to improve the image information recovery effect; based on the four-grid puzzle in the construction process of Tetrolet transform, and combined with related mathematical issues, the pixel-level scrambling method based on domino tile issue, the bit-level scrambling method based on domino overturn issue and the diffusion method based on four-grid puzzle are designed, which combine the plaintext information with the encryption process closely and improve the anti-attack ability. Non-negative matrix decomposition is introduced to embed the secret image into the carrier image, which not only preserves the image information to a large extent, but also suppresses the influence of external changes to a certain extent.

BRIEF DESCRIPTION OF DRAWINGS

FIG. 4 is a schematic diagram of puzzle coding;

DETAILED DESCRIPTION OF THE EMBODIMENTS

Figure 1A:
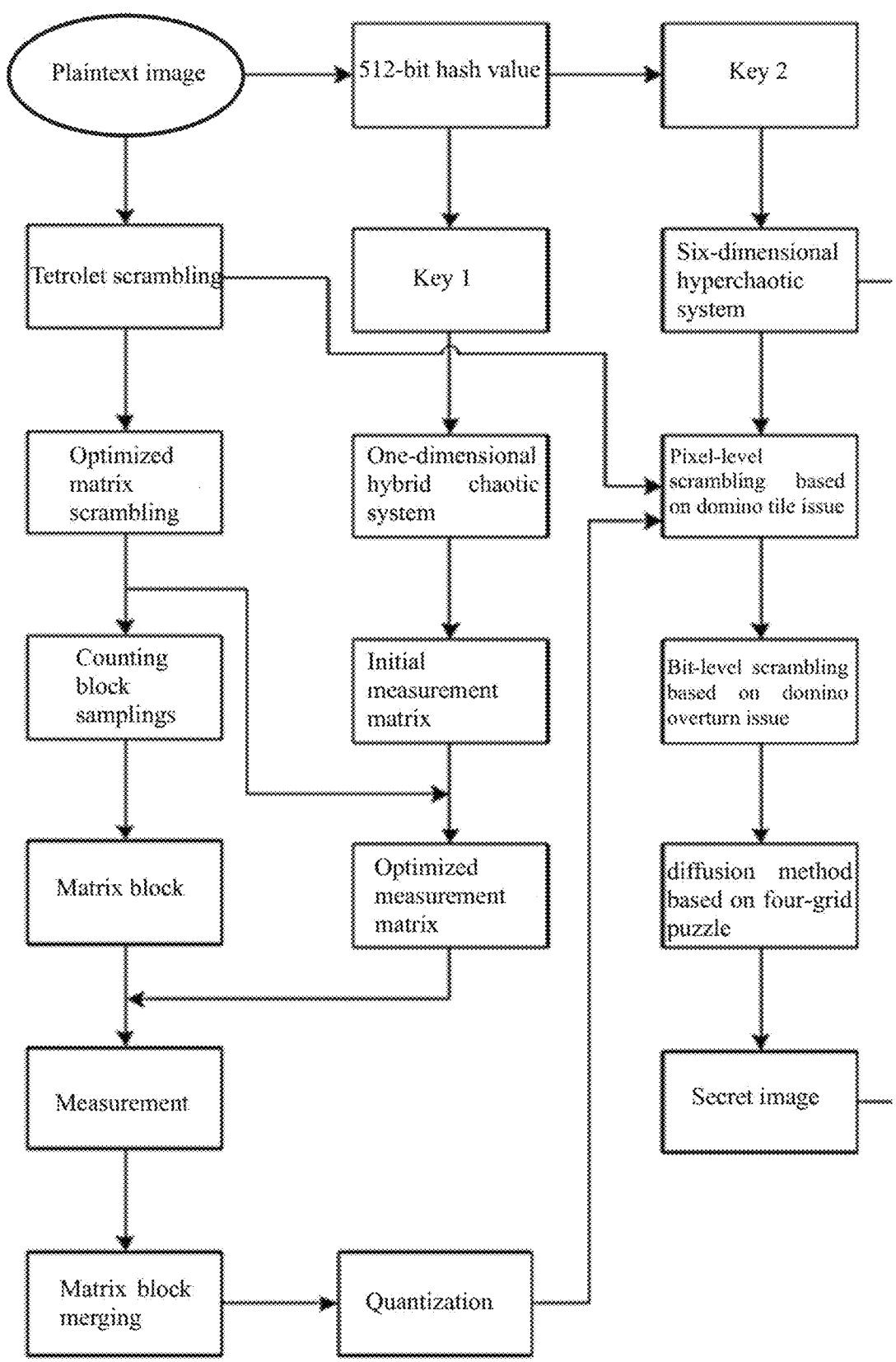
FIG. 1A and FIG. 1B is a flow chart of an image encryption process of the present disclosure.

The present disclosure is a method for encrypting a visually secure image based on adaptive block compressed sensing and non-negative matrix decomposition, which combines the block compressed sensing theory with non-negative matrix decomposition, and can solve the issues, of poor reconstruction quality of decrypted images and insufficient encryption effect.

Firstly, the Tetrolet transform is performed on the plain image, then the sparsity degree is optimized on the sparsity matrix and the matrix scrambling is performed, such that the sparsity degree in each block region of the image matrix is equalized. Then according to the image information, the sampling number of the block region is calculated, the measurement matrix is constructed and optimized, and the image is compressed by using the optimized measurement matrix. The compressed image is then scrambled and diffused to complete the encryption process. Finally, the image information is embedded into the carrier image through non-negative matrix decomposition to obtain a visually safe ciphertext image. The decryption process is the inverse of the encryption process.

There are two chaotic systems used in the present disclosure, namely, a six-dimensional hyperchaotic system and a hybrid chaotic system. Hybrid chaotic systems are used to construct measurement matrices, and six-dimensional hyperchaotic systems are used to generate random sequences required for scrambling, diffusion and embedding processes.

The mathematical formula of the six-dimensional hyperchaotic system is as follows:

$$\begin{cases} \dot{x}_1 = h(x_2 - x_1) + x_4 \\ \dot{x}_2 = -fx_2 - x_1 x_3 + x_6 \\ \dot{x}_3 = -1 + x_1 x_2 \\ \dot{x}_4 = -rx_2 - x_5 \\ \dot{x}_5 = kx_2 + x_4 \\ \dot{x}_6 = gx_1 + mx_2 \end{cases}$$

where h, l, f, k, r are system parameters, (h, l, f, k, g, m, r)=(10,100,2.7,2,−3,1,1). $x_1$, $x_2$, $x_3$, $x_4$, $x_5$, $x_6$ are the initial points, while $\dot{x}_1$, $\dot{x}_2$, $\dot{x}_3$, $\dot{x}_4$, $\dot{x}_5$, $\dot{x}_6$ are the system states. The mathematical formula of the hybrid chaotic system is as follows:

$$H = \begin{cases} \left((r^{10})\frac{r}{4}\sin\left(\pi\frac{r^2}{2}x_i\right)(1-x_i)\right) \bmod 1, & rx_i(1-x_i) \le \frac{1}{2} \\ \left((r^{10})\frac{r}{4}\sin\left(\pi\frac{r}{2}(1-rx_i(1-x_i))\right)\right) \bmod 1, & rx_i(1-x_i) > \frac{1}{2} \end{cases}$$

Where $r \in [1.4, 4]$.

The mathematical theory used in the present disclosure is the doth no the issue. There are the generated functions of the domino tile issue of 2×N and the domino tile, issue of 3×N, respectively. Without considering the domino shape, the generated function of solution for the domino tile issue of 2×N is:

$$T_2 = \frac{1}{1 - z - z^2}$$

The generated function of the domino tile issue of 3×N is $$T_3 = \frac{1 - z^3}{1 - 4z^3 + z^6},$$

wherein z represents a domino tile.

In the case of considering the domino shape, the generated function of solution for the domino tile issue of 2×N is:

$$T_2 = \frac{1}{1 - a - b^2} = \sum_{j,m \ge 0} \binom{j+m}{j} a^j b^{2m}$$

The generated function of the domino tile issue of 3×N is:

$$T_3 = \frac{1 - b^3}{(1 - b^3)^2 - 2a^2 b} = \sum_{k,m \ge 0} \binom{m + 2k}{m} 2^k a^{2k} b^{k+3m}$$

where a and b denote vertical horizontal dominoes, respectively, $$\binom{j+m}{j}$$

is a quantity of methods for laying a 2×(j+2m) rectangle with j vertical dominoes and 2m horizontal dominoes, and $$\binom{m + 2k}{m} 2^k$$

is a quantity of methods for laying: a 3×(3k+3m)3×(3k+3m) rectangle with 2k vertical dominoes and k+3m horizontal dominoes.

Examples of the present disclosure are carried out on the basis of the technical method of the present disclosure, and detailed embodiments and specific operating procedures of the present disclosure are given, but the scope of protection of the present disclosure is not limited to the following, examples.

The parameters used in the examples include a sampling rate SR=0.25, as threshold value TS=11, a block size $B_1$=64 in matrix scrambling with balance block sparsity as a target, a block size $B_2$=8 in the process of obtaining a measurement value matrix, a block size $B_3$=16 in the process of blocking a carrier image, a sampling interval d=4 for the chaotic system, an additional iteration number t=800 for the chaotic system, and an embedding strength factor α=0.15. The chaotic system used is as described above.

Parameters and initial values of at six-dimensional hyperchaotic system and a hybrid chaotic system are generated according to plaintext image information; a chaotic sequence is generated by iteration of the six-dimensional hyperchaotic system, and the random sequence is constructed using the generated chaotic sequence; Tetrolet transformation is performed on the plaintext image to generate a coefficient matrix; an optimized scrambled matrix is generated and the coefficient matrix is scrambled; regarding a scrambled coefficient matrix, a quantity of samplings allocated to each block after the coefficient matrix is divided into blocks is calculated according to a block sampling strategy based on region energy; the chaotic sequence is generated by iteration of the hybrid chaotic system, an initial measurement matrix is constructed using the generated Chaotic sequence, and a final measurement matrix is obtained by optimizing and normalizing the initial measurement matrix; according to the block compressed sensing theory, the block measurement matrix is used to measure a corresponding block coefficient matrix, and the measurement value matrix is obtained; the measurement value matrix is quantized to obtain a quantized measurement value matrix; a quantized measurement value matrix is scrambled at pixel level by a scrambling method based on domino tile issue, and the measurement value matrix is obtained after a first scrambling; the measurement value matrix is scrambled at pixel level after the first scrambling by the scrambling method based on domino overturn issue, and the measurement value matrix after a second scrambling is obtained; the measurement value matrix after the second scrambling is diffused using a diffusion method based on a four-grid puzzle to obtain a diffused measurement value matrix; then a reverse diffusion operation is performed on a diffused measurement value matrix to obtain a secret image matrix; at last, the secret image matrix is embedded into a carrier image by non-negative matrix decomposition to Obtain a ciphextext image.

Figure 1B:
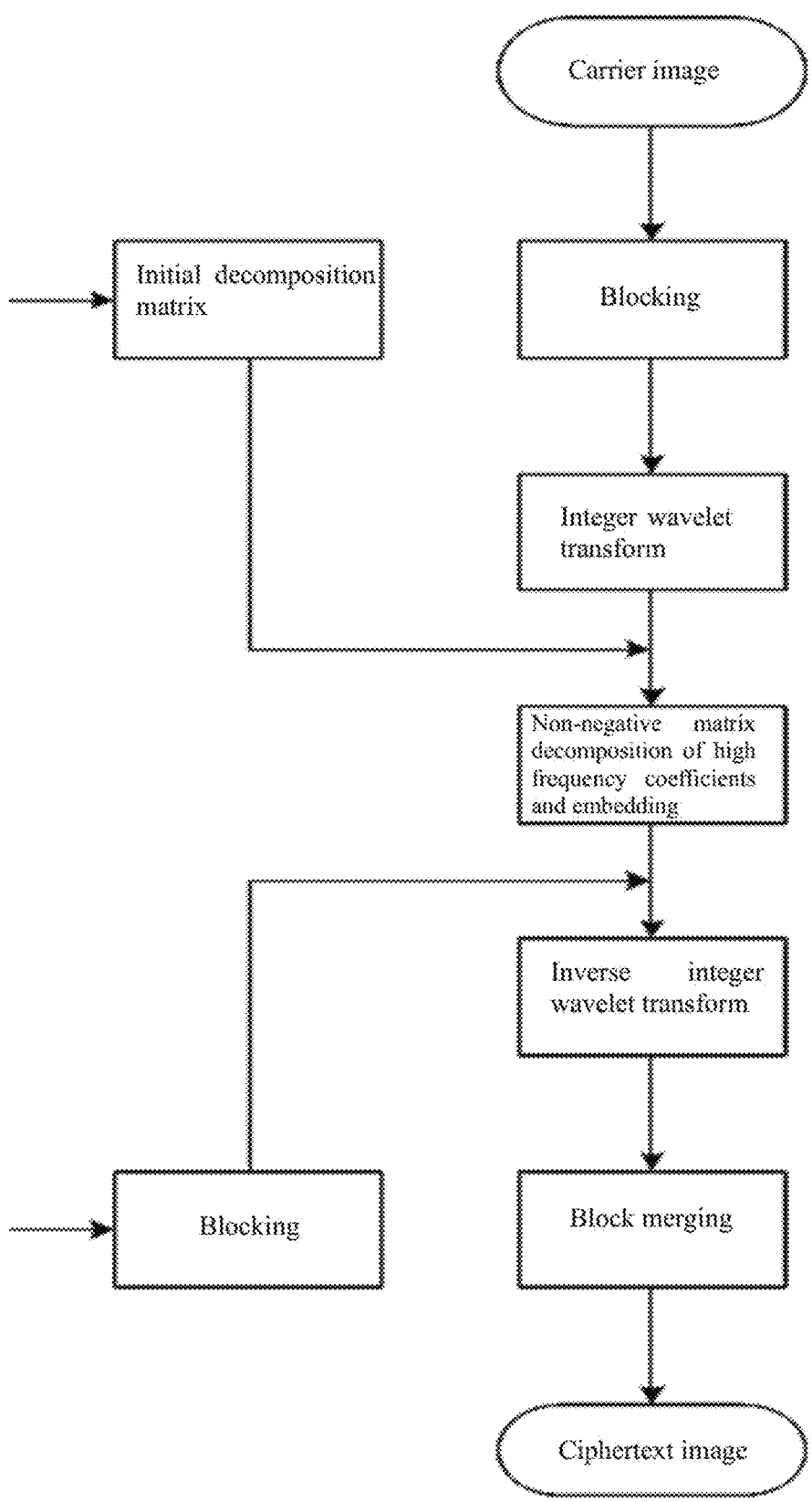

The encryption process is illustrated in FIG. 1A and FIG. 1B. The above-mentioned steps are described in detail as follows:

Step 1: first, the SHA512 function is used to generate a 512-bit hash value K for plaintext image.

$$K = SHA512(img)$$

It is converted into 64 decimal numbers with a set of 8 bits, denoted as array k, to obtain matrices k11-k62 and k7 via k and the calculation process is as follows:

$$\begin{cases} k11 = \text{reshape}(k(1:6), 3, 2) \\ k12 = \text{reshape}(k(7:10), 2, 2) \\ k21 = \text{reshape}(k(11:16), 3, 2) \\ k22 = \text{reshape}(k(17:20), 2, 2) \\ k31 = \text{reshape}(k(21:26), 3, 2) \\ k32 = \text{reshape}(k(27:30), 2, 2) \\ k41 = \text{reshape}(k(31:36), 3, 2) \\ k42 = \text{reshape}(k(37:40), 2, 2) \\ k51 = \text{reshape}(k(41:46), 3, 2) \\ k52 = \text{reshape}(k(47:50), 2, 2) \\ k61 = \text{reshape}(k(51:56), 3, 2) \\ k62 = \text{reshape}(k(57:60), 2, 2) \\ k7 = (k(61:64)) \end{cases}$$

For k11-k62, the calculation process is as follows:

$$\begin{cases} kr1 = KR(k11, k12) \\ kr2 = KR(k21, k22) \\ kr3 = KR(k31, k32) \\ kr4 = KR(k41, k42) \\ kr5 = KR(k51, k52) \\ kr6 = KR(k61, k62) \end{cases}$$

where KR is used to calculate the Khatri-Rao product of the two matrices. k7 is used to calculate respectively with kr1-kr6, kr1 as the Khatri-Rao product of k11 and k12, kr2 as the Khatri-Rao product of k21 and k22, kr3 as the Khatri-Rao product of k31 and k32, Kr4 as the Khatri-Rao product of k41 and k42, kr5 as the Khatri-Rao product of k51 and k52, and kr6 as the Khatri-Rao product of k61 and k62, respectively. Operation is performed for example, the Kronecker product kro71 of k7 and kr1 is calculated, the average value of kro71 is recorded as Mkro71, kro71 is converted into a one-dimensional matrix kro71', and Mkro71 is added to the end of the matrix to form a matrix of 1*49 which is rearranged into a matrix of 7*7

$$\begin{cases} kro71 = kron(k7, kr1) \\ kro71' = \text{reshape}(kro71, 1, 48) \\ kro71'' = [kro71', Mkro71] \\ kro71''' = \text{reshape}(kro71'', 7, 7) \end{cases}$$

The diagonal matrix s1 with singular values is obtained by svd of kro71''', and the mean value me1 of s1 is used to obtain key1, $$\begin{cases} [u1, s1, v1] = svd(kro71''') \\ key1 = \text{mod}(me1/10^7, 1) \end{cases}.$$

u1 and v1 are two unitary matrices.

Similarly, key2-key6 can be obtained, and key1, key2, key3, key4, key5, key6 constitute a set of keys that can be used as initial values $x_0, y_0, z_0, u_0, w_0$ of the six-dimensional hyperchaotic system, Namely, $x_0, y_0, z_0, u_0, v_0, w_0$ are used as the initial values $x_1, x_2, x_3, x_4, x_5, x_6$ of the six-dimensional hyperchaotic system respectively, and chaotic sequences xn, yn, zip, un, vu, wn are generated by iteration.

The array k previously generated by the hash value of the plaintext image is used to obtain the matrix k1-k4

$$\begin{cases} k1 = \text{reshape}(k(1:16), 4, 4) \\ k2 = \text{reshape}(k(17:32), 4, 4) \\ k3 = \text{reshape}(k(33:38), 4, 4) \\ k4 = \text{reshape}(k(49:64), 4, 4) \end{cases}$$

The Hadamard product of k1 and k4 is calculated to obtain k14, and the Hadamard product of k2 and k3 is calculated to obtain k23

$$\begin{cases} k14 = k1.*k4 \\ k23 = k2.*k3 \end{cases}$$

$$\begin{cases} [u14, s14, v14] = svd(k14) \\ [u23, s23, v23] = svd(k23) \end{cases}$$

Two diagonal matrices s14 and s23 with singular values are obtained by svd for k14 and k23, respectively. Key14 and key23 are obtained as the parameters $r_0$ and initial values $xx_0$ of the mixed chaotic system by means of the mean values me14 and me23 in s14 and s23. As an initial value of the hybrid chaotic system, $xx_0$ is used to iteratively generate a chaotic sequence, which is used to generate an initial measurement matrix chaosMat.

$$\begin{cases} k14 = 1.4 + \text{mod}(me14/10^4, 2.6) \\ key23 = \text{mod}(me23/10^4, 1) \end{cases}$$

Step 2: a size of image matrix is set to M'×N', a total quantity of pixels is num, and a sampling interval of the chaotic sequence is d.

Firstly, the initial value $x_0, y_0, z_0, u_0, v_0, w_0$ of the chaotic system is substituted in six dimensions and iterated num×d times to generate six corresponding chaotic sequences xn, yn, zn, un, vn, wn. The sub-sequences are obtained by sampling six chaotic sequences with d.

$$\begin{cases} x1 = \text{floor}(\text{abs}(xn(1:d:\text{end}-d+1))*100)+1) \\ x2 = \text{mod}(\text{floor}(\text{abs}(xn(2:d:\text{end}-d+2))*100)+1), 256) \\ x3 = \text{mod}(\text{floor}(\text{abs}(xn(3:d:\text{end}-d+3))*100)+1), 256) \\ x4 = \text{mod}(\text{floor}(\text{abs}(xn(4:d:\text{end}-d+4))*100)+1), 256) \end{cases}$$

$$\begin{cases} y1 = \text{floor}(\text{abs}(yn(1:d:\text{end}-d+1))*100)+1) \\ y2 = \text{mod}(\text{floor}(\text{abs}(yn(2:d:\text{end}-d+2))*100)+1), 256) \\ y3 = \text{mod}(\text{floor}(\text{abs}(yn(3:d:\text{end}-d+3))*100)+1), 256) \\ y4 = \text{mod}(\text{floor}(\text{abs}(yn(4:d:\text{end}-d+4))*100)+1), 256) \end{cases}$$

$$\begin{cases} z1 = \text{floor}(\text{mod}(\text{abs}(zn(1:d:\text{end}-d+1))*100), 100)+1) \\ z2 = \text{mod}(\text{floor}(\text{abs}(zn(2:d:\text{end}-d+2))*100)+1), 256) \\ z3 = \text{mod}(\text{floor}(\text{abs}(zn(3:d:\text{end}-d+3))*100)+1), 256) \\ z4 = \text{mod}(\text{floor}(\text{abs}(zn(4:d:\text{end}-d+4))*100)+1), 256) \end{cases}$$

$$\begin{cases} u1 = \text{floor}(\text{mod}(\text{abs}(un(1:d:\text{end}-d+1))*5), 9)+1) \\ u2 = \text{mod}(\text{floor}(\text{abs}(un(2:d:\text{end}-d+2))*100)+1), 256) \\ u3 = \text{mod}(\text{floor}(\text{abs}(un(3:d:\text{end}-d+3))*100)+1), 256) \\ u4 = \text{mod}(\text{floor}(\text{abs}(un(4:d:\text{end}-d+4))*100)+1), 256) \end{cases}$$

-continued
$$\begin{cases} v1 = \text{floor}(\text{mod}(\text{abs}(vn(1:d:\text{end}-d+1))*100), 16)+1) \\ v2 = \text{floor}(\text{mod}(\text{abs}(vn(2:d:\text{end}-d+2))*100), 16)+1) \\ v3 = \text{floor}(\text{abs}(vn(3:d:\text{end}-d+3))*100)+1) \\ v4 = \text{floor}(\text{abs}(vn(4:d:\text{end}-d+4))*100)+1) \\ v5 = \text{mod}(\text{abs}(vn(5:d*2:\text{end})), 1) \\ v6 = \text{mod}(\text{abs}(vn(6:d*2:\text{end})), 1) \\ v56 = [v5, v6] \end{cases}$$

$$\begin{cases} w1 = \text{floor}(\text{abs}(wn(1:d:\text{end}-d+1))*100)+1) \\ w2 = \text{floor}(\text{abs}(wn(2:d:\text{end}-d+2))*100)+1) \\ w3 = \text{floor}(\text{mod}(\text{abs}(wn(3:d:\text{end}-d+3))*100), 4)+1) \\ w4 = \text{floor}(\text{abs}(wn(4:d:\text{end}-d+4))*100)+1) \\ w5 = \text{mod}(\text{abs}(wn(5:d*2:\text{end})), 1) \\ w6 = \text{mod}(\text{abs}(wn(6:d*2:\text{end})), 1) \\ w56 = [w5, w6] \end{cases}$$

Quantizing the sequence w1, w2, w4, v3, v4 between [0, 1], $$\begin{cases} w1(i) = 1.0/(1+\exp(w1(i))), i = 1, 2 \ldots num \\ w2(i) = 1.0/(1+\exp(w2(i))), i = 1, 2 \ldots num \\ w4(i) = 1.0/(1+\exp(w4(i))), i = 1, 2 \ldots num \\ v3(i) = 1.0/(1+\exp(v3(i))), i = 1, 2 \ldots num \\ v4(i) = 1.0/(1+\exp(v4(i))), i = 1, 2 \ldots num \end{cases}$$

The above-mentioned sequence is further manipulated to obtain a threshold sequence thresholdSeq for the bit-level scrambling process:

$$\begin{cases} w11 = \text{mod}(w1+w4, 1) \\ w12 = \text{mod}(\text{ones}(1, num)+w1-w4, 1) \\ w21 = \text{mod}(w2+w4, 1) \\ w22 = \text{mod}(\text{ones}(1, num)+w2-w4, 1) \\ v31 = \text{mod}(v3+w4, 1) \\ v32 = \text{mod}(\text{ones}(1, num)+v3-w4, 1) \\ v41 = \text{mod}(v4+w4, 1) \\ v42 = \text{mod}(\text{ones}(1, num)+v4-w4, 1) \\ thresholdSeq = [w11, w21, v31, v41, w12, w22, v42] \end{cases}$$

Here, the ones ( ) function is used to construct the all-ones matrix. Then, 12 random number sequences seq11-seq43 are constructed for the diffusion process to be inserted outside image matrix.

$$\begin{cases} seq11 = x2(1:M':\text{end}) \\ seq12 = y3(1:M':\text{end}) \\ seq13 = z4(1:M':\text{end}) \end{cases}$$

$$\begin{cases} seq21 = y2(1:M':\text{end}) \\ seq22 = z3(1:M':\text{end}) \\ seq23 = u4(1:M':\text{end}) \end{cases}$$

$$\begin{cases} seq31 = [z2(1:N':\text{end}), z2(2:7)]' \\ seq32 = [u3(1:N':\text{end}), u3(3:8)]' \\ seq33 = [x4(1:N':\text{end}), x4(4:9)]' \end{cases}$$

$$\begin{cases} seq41 = [u2(1:N':\text{end}), u2(2:7)]' \\ seq42 = [x3(1:N':\text{end}), x3(3:8)]' \\ seq43 = [y4(1:N':\text{end}), y4(4:9)]' \end{cases}$$

rotSeq1, rotSeq2 and chSeq are constructed for diffusion process:

$$\begin{cases} rotSeq1 = \mod(x2(2:N':\text{end}-N'), 3) + 1 \\ rotSeq2 = \mod(y2(2:N':\text{end}-N'), 3) + 1 \\ chSeq = \mod(z2(2:N':\text{end}-N'), 3) + 1 \end{cases}$$

Sequences S1 and S2 are then constructed for diffusing the image matrix.

$$\begin{cases} S11 = x3(3:8:\text{end}) \\ S12 = y3(3:8:\text{end}) \\ S13 = z3(3:8:\text{end}) \\ S14 = u3(3:8:\text{end}) \\ S15 = x4(3:8:\text{end}) \\ S16 = y4(3:8:\text{end}) \\ S17 = z4(3:8:\text{end}) \\ S18 = u4(3:8:\text{end}) \end{cases}$$

$$\begin{cases} S1(i) = S11\left(\frac{i-1}{8}+1\right), i=1,9,17 \ldots M'*N' \\ S1(i+1) = S12\left(\frac{i-1}{8}+1\right), i=1,9,17 \ldots M'*N' \\ S1(i+2) = S13\left(\frac{i-1}{8}+1\right), i=1,9,17 \ldots M'*N' \\ S1(i+3) = S14\left(\frac{i-1}{8}+1\right), i=1,9,17 \ldots M'*N' \\ S1(i+4) = S15\left(\frac{i-1}{8}+1\right), i=1,9,17 \ldots M'*N' \\ S1(i+5) = S16\left(\frac{i-1}{8}+1\right), i=1,9,17 \ldots M'*N' \\ S1(i+6) = S17\left(\frac{i-1}{8}+1\right), i=1,9,17 \ldots M'*N' \\ S1(i+7) = S18\left(\frac{i-1}{8}+1\right), i=1,9,17 \ldots M'*N' \end{cases}$$

$$\begin{cases} S21 = x3(4:8:\text{end}) \\ S22 = y3(4:8:\text{end}) \\ S23 = z3(4:8:\text{end}) \\ S24 = u3(4:8:\text{end}) \\ S25 = x4(4:8:\text{end}) \\ S26 = y4(4:8:\text{end}) \\ S27 = z4(4:8:\text{end}) \\ S28 = u4(4:8:\text{end}) \end{cases}$$

$$\begin{cases} S2(i) = S21\left(\frac{i-1}{8}+1\right), i=1,9,17 \ldots M'*N' \\ S2(i+1) = S22\left(\frac{i-1}{8}+1\right), i=1,9,17 \ldots M'*N' \\ S2(i+2) = S23\left(\frac{i-1}{8}+1\right), i=1,9,17 \ldots M'*N' \\ S2(i+3) = S24\left(\frac{i-1}{8}+1\right), i=1,9,17 \ldots M'*N' \\ S2(i+4) = S25\left(\frac{i-1}{8}+1\right), i=1,9,17 \ldots M'*N' \\ S2(i+5) = S26\left(\frac{i-1}{8}+1\right), i=1,9,17 \ldots M'*N' \\ S2(i+6) = S27\left(\frac{i-1}{8}+1\right), i=1,9,17 \ldots M'*N' \\ S2(i+7) = S28\left(\frac{i-1}{8}+1\right), i=1,9,17 \ldots M'*N' \end{cases}$$

Step 3: the low-frequency coefficient matrix and the high-frequency coefficient matrix generated after Tetrolet transformation of the plaintext image constitute a new coefficient matrix X according to the low-frequency at the upper high-frequency at the lower. A block size $B_1$ is set, X is rearranged into a matrix X1 with a row dimension $B_1$, and in order to reduce the maximum block spare and improve the sampling efficiency, matrix scrambling is performed on X1 with the goal of balancing the block sparsity to obtain X2.

Step 4: a size of a block region B, an image sampling rate. SR and a weight matrix W are set. Considering the computational complexity and the adjacent pixel correlation of the image, we set the size of B as 4, 8, 16.

$$\begin{cases} W = [1, 2, 2, 1], \text{ if } B = 4 \\ W = [1, 1, 2, 2, 2, 2, 1, 1], \text{ if } B = 8 \\ W = [1, 1, 1, 1, 2, 2, 2, 2, 2, 2, 2, 2, 1, 1, 1, 1], \text{ if } B = 16 \end{cases}$$

The quantity of image blocks G and the quantity of samplings SF are calculated $$G = \text{num1}/B^2$$

$$SF = \text{num1} \times SR$$

wherein num1 represents the quantity of elements of the scrambled coefficient matrix; and SR is the image sampling rate.

The image is divided into blocks and the energy $E_i$ of pixels in the block region is calculated $$\begin{cases} E_i = \text{sum}(W' \times W. \times X_i./36), \text{ if } B = 4 \\ E_i = \text{sum}(W' \times W. \times X_i./144), \text{ if } B = 8 \\ E_i = \text{sum}(W' \times W. \times X_i./576), \text{ if } B = 16 \end{cases}$$

where $X_i$ is an image block, and W' is a transpose matrix of W. J is a matrix operation.

Energy occupancy rate $PE_1$ of each image block is calculated $$PE_i = \text{abs}(E_i)/\Sigma_{i=1}^n \text{abs}(E_i)$$

The quantity $AM_i$ of samplings per image block is calculated, $AM_i = PE_i \times SF, i=1,2 \ldots G$.

The matrix formed by the quantity of samplings of image blocks at corresponding positions is the sampling matrix AM of the whole image $$AM = \begin{pmatrix} AM_1 & \ldots & AM_{m/B} \\ \vdots & \ddots & \vdots \\ AM_{n/B} & \ldots & AM_G \end{pmatrix}$$

Considering that the quantity of samplings may not be an integer, a rounding operation is performed to obtain the actual quantity $AM_i'$ of samplings of the image blocks and the sampling matrix AM' of the image $$AM_i' = \text{round}(PE_i \times SF), i=1,2 \ldots G$$

$$AM' = \begin{pmatrix} AM_1' & \ldots & AM_{m/B}' \\ \vdots & \ddots & \vdots \\ AM_{n/B}' & \ldots & AM_G' \end{pmatrix}$$

The AM' is sorted in an ascending order to obtain an index sequence ind_AM, [~,ind_AM]=sort(AM').

A maximum element in AM' is adjusted to keep a total quantity of samplings unchanged $$AM'(ind\_AM(end))=AM'(ind\_AM(end))+round(sum(AM)-sum(AM_i'))$$

It is noted that the maximum element in AM' is maxAM, and this parameter is used in the iterative process of chaotic system.

$$maxAM=max(AM')$$

Step 5: an image size is set to M0×N0 such that the hybrid chaotic system is iterated for maxAM×M0×N0+t times according to a maximum quantity maxAM of block samplings, and the initial measurement matrix chaosMat of (maxAM×M0)×N0 is generated with the remaining valises after discarding the first t values.

Step 6; the measurement matrix chaosMat is optimized to obtain an optimized measurement matrix Φ', and the optimization process is performed in a manner of: setting a size B of the block region, dividing the image into blocks and calculating a sum of absolute values of pixel values within the block to obtain a matrix Sum, and arranging elements in the Sum in a descending order to obtain a ranking index value, which is denoted as Pos; adjusting the generated initial measurement matrix chaosMat to a matrix of M1×N1, wherein N1=num1/B², num1 represents a quantity of elements of the scrambled coefficient matrix; M1=Num'/N1, Num' is a quantity of elements of the initial measurement matrix chaosMat; calculating a sum of a mean value and a median value of the absolute values of column vectors of the initial measurement matrix and assigning corresponding weights, so as to obtain a sequence Sum1:

$$Sum1(i)=w_1 \times sum(abs(chaosMat(:,i)))+w_2 \times median(abs(chaosMat(:,i)))$$

Wherein $w_1$ and $w_2$ are weight coefficients; and $w_1=0.5$, $w_2=0.5$ is selected in the present embodiment.

Sum1 is sorted in descending order to obtain an index sequence Pos1, and column vectors of the measurement matrix chaosMat of a corresponding size are rearranged according to the size of a pixel sum of an image block so as to obtain a rearranged measurement matrix Φ;

$$\Phi(:,Pos(i))=chaoMat(:,Pos1(i))$$

Finally, the measurement matrix Φ' is obtained by normalization. The normalization process is as follows:

$$\Phi' = \sqrt{\frac{2}{M0}}\Phi,$$

M0 is the row dimension of the image.

Step 7: a final block measurement matrix Φ" is determined according to a block sampling rate, X2 is divided into blocks according to a set block size $B_2$ and each block is converted into a column vector to obtain a matrix X3, and a coefficient matrix is compressed using block compression sensing to obtain a measurement value matrix $$Y1, \Phi'' = \begin{pmatrix} \Phi_1 \\ \Phi_2 \\ \vdots \\ \Phi_i \end{pmatrix};$$

wherein $\Phi_i$ is the matrix of AM'(i)×$B_2^2$, and is obtained by rearranging column vectors Φ'(1:AM'(i)×$B_2^2$, i), i=1,2 . . . 1,1=M0×N0/$B_2^2$.

The measurement procedure is as follows;

$$Y_i = \Phi_i X3(:,i)$$

$$Y1 = \begin{pmatrix} Y_1 \\ Y_2 \\ \vdots \\ Y_l \end{pmatrix}$$

Thereafter, Y1 is rearranged into the matrix of (SR×M0)×N0.

Step 8: the measurement matrix elements are quantized to interval of [0.255], resulting in a matrix Y2.

$$Y2 = round\left(255 \times \frac{Y1 - Min}{Max - Min}\right)$$

where Min and Max are the maximum and minimum values of Y1, respectively.

Step 9: firstly, the sub-sequences x1, y1 of the six-dimensional hyperchaotic system are modulo-operated to obtain a modulo-operated sequence x1',y1':

$$\begin{cases} x1' = mod(x1, 16) + 1 \\ y1' = mod(y1, 8) + 1 \end{cases}.$$

Figure 2:
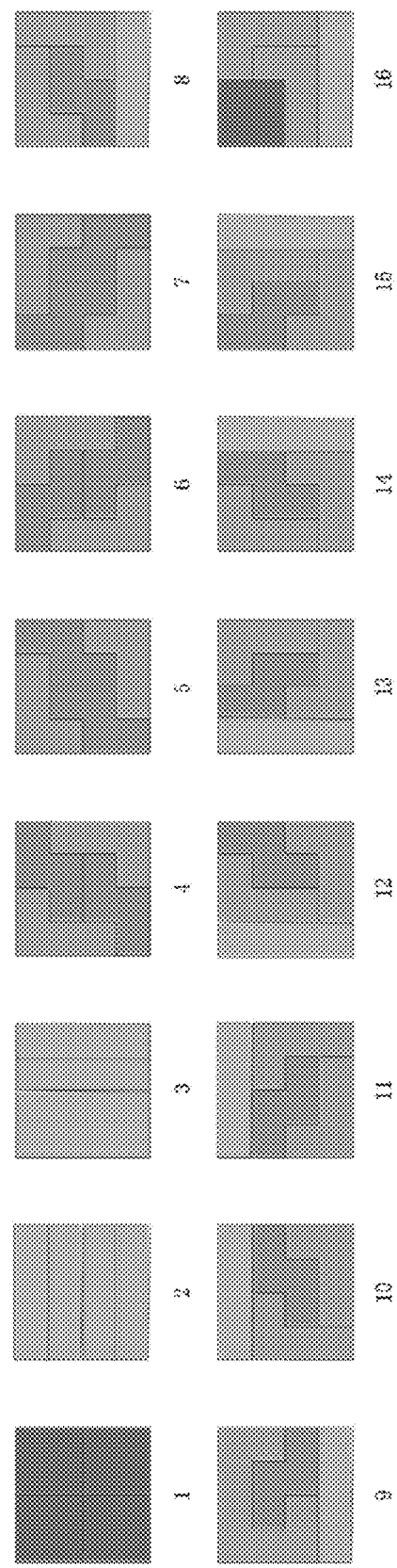
FIG. 2 is a schematic diagram of 16 types of four-grid puzzles.
Figure 3:
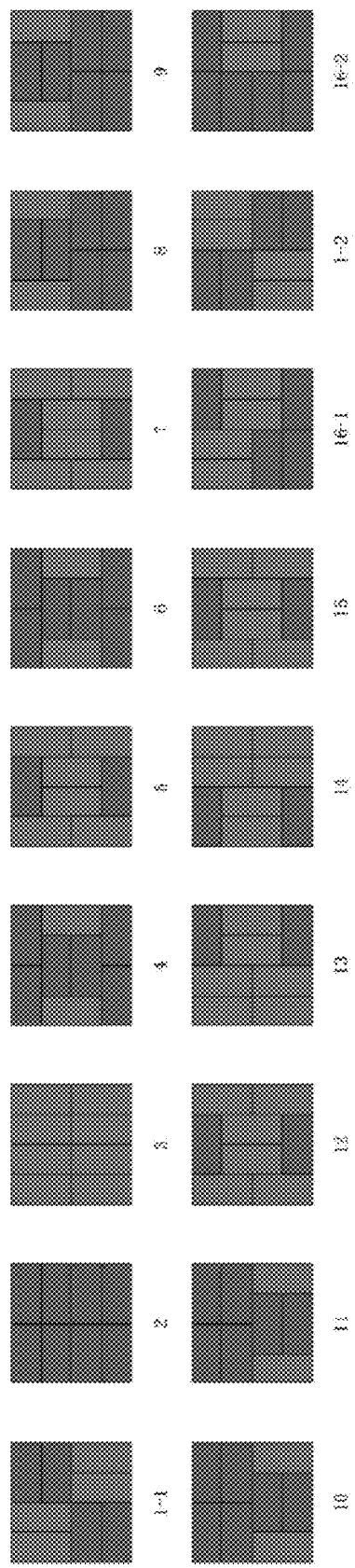
FIG. 3 is a schematic diagram of segmentation of the puzzles.

Taking each element in the sequence x1' as a serial number of the four-grid puzzle in FIG. 2, mask segmentation is performed according to FIG. 3 and encoding is performed using an encoding rule of FIG. 4, AND a character sequence dominoesSeq containing '_' and '|' can be obtained. y1' is taken as an index sequence for each character sequence to be indexed, resulting in a flag bit flag with a value of 0 or 1, and finally a flag bit matrix Flags can be obtained.

$$\begin{cases} Flags\ (i) = 1, \text{if } dominoesSeq = (y1'(i)) = `|`\\ Flags\ (i) = 0, \text{if } dominoesSeq(y1'(i)) = `\_` \end{cases}$$

According to the relevant theory of domino tile issue, two sequences of Num2 and Num3 are obtained, in which Num2 and Num3 are the sequences composed of the method quantities corresponding to domino tile issue without considering the 2×N and 3×N domino shape. When the length N of rectangle in domino tile issue is set to 0-255. Next, the following matrices are initialized: initial, Full, Finish, Flags1, S. Initial represents an initial value of an image matrix, Full is a target value to be reached by each element in the image matrix. Finish is a result of scrambling the image matrix. Flags1 is a flag matrix used for recording the position of an element in the image matrix where scrambling has been completed, and S is an index matrix used for determining the position of the next element to be found by the current matrix element.

Sequences z1, u1 are rearranged to obtain matrices z1' and u1' having the same dimensions as the image matrix, and then the length N of the rectangle in the domino tile issue is determined, N=u1'(i, j), u1'(i, j) representing the elements of u1' in the ith row and the jth column.

The matrices Full and S are constructed as follows:

$$\begin{cases} n = 2, \text{Full}(i, j) = Num2(N + 1); \text{ if } \mod(z1'(i, j), 2) = 0 \\ n = 3, \text{Full}(i, j) = Num3(N + 1); \text{ else} \end{cases}$$

$$\begin{cases} S(i, j) = z1'(i, j), \text{ if } z1'(i, j) \text{ satifying one of nine special conditions} \\ S(i, j) = dominoesTile(n, N, z1'(i, j), \text{Flags}(i, j)), \text{ else} \end{cases}$$

where dominoesTile is a function for solving a corresponding issue in the case of considering the shape of a domino tile; and n represents the width of rectangle in domino tile issue; however, not all inputs can be solved and the nine special cases are as follows:

$$\begin{cases} z1'(i, j) \times 2 > n \times N \\ n = 3 \ \& \ \text{Flags}(i, j) = 0 \ \& \ \left(N \times \frac{3}{2} - z1'(i, j)\right) \mod 2 \neq 0 \\ n = 3 \ \& \ \text{Flags}(i, j) = 0 \ \& \ (z1'(i, j) \times 2 - N) < 0 \\ N < z1'(i, j) \\ n = 3 \ \& \ N \mod 2 \neq 0 \\ n = 3 \ \& \ \text{Flags}(i, j) = 1 \ \& \ z1'(i, j) \mod 2 \neq 0 \\ n = 3 \ \& \ \text{Flags}(i, j) = 0 \ \& \ (N - z1'(i, j)) \mod 2 \neq 0 \\ n = 2 \ \& \ \text{Flags}(i, j) = 0 \ \& \ z1'(i, j) \mod 2 \neq 0 \\ n = 2 \ \& \ \text{Flags}(i, j) = 1 \ \& \ (N - z1'(i, j)) \mod 2 \neq 0 \end{cases}$$

The image matrix elements are scrambled using an index matrix S. The image matrix I and the index matrix S are respectively expanded into sequences I' and S'. Each time, a half of the length len of the sequence I' is taken as a starting point start, an element s' at the corresponding position in S' is taken as an index value, the element i' at ((start+s') mod len) in I' is taken and added to the end of a new sequence E, and the position of the element i' is taken as a new starting point start; and the above-mentioned process is continuously repeated until all the elements in I' are scrambled. To further complicate the scrambling process, the scrambling algorithm in the method will repeat the scrambling process described above at most twice. After each scrambling, screening is performed once under the following conditions:

Finish(i,j)=E(i,j), if Initial(i,j)+roundCount×E(i,j)
≥Full(i,j)

where roundCount is the number of scrambled rounds, Finish(i, j), E(i, j), Initial(i, j), Full(i, j) are the elements of the matrices Finish, E, Initial, Full in the ith row and the jth column, respectively.

In addition, N and matrix S are updated once:

$$\begin{cases} pos = (((NZCols(i) - 1 \times m + NZRows(i)) \times roundCount \mod len1) + 1 \\ N = u1'(pos) \\ S(i) = z1'(pos), \text{ if } z1'(pos) \text{ satisfying one of nine special conditions} \\ S(i) = dominoesTile(n, N, z1'(pos), \text{Flags}(pos)), \text{ else} \end{cases}$$

where m is the row dimension of the image matrix, len1 is the length of z1', and NZRows and NZCols are arrays composed of rows and columns in Flags1 matrix of non-Zero elements in the Flags1 respectively. The sequence composed of the remaining elements after screening is restE, and if the remaining elements after the two scrambling processes fail to complete the scrambling, the remaining elements are put into the remaining positions respectively, and the whole scrambling process of Y2 ends to obtain Y3.

Step 10: taking the sequence v1 as a mask sequence coveringSeq1, threshold sequence thresholdSeq is used to generate index sequences resultLR, resultUD for binary shifting;

dominoes=divideDominoes(coveringSeq1)

$$\begin{cases} horizontalSeq(i) = \text{'\_'}, \text{ if dominoes }(i) = \text{'\_'} \\ horizontalSeq(i) = \text{'.'}, \text{ else} \end{cases}$$

$$\begin{cases} verticalSeq(i) = \text{'.'}, \text{ if dominoes }(i) = \text{'\_'} \\ verticalSeq(i) = \text{'|'}, \text{ else} \end{cases}$$

$$\begin{cases} pushLRSeq = \text{'}L\text{'}, \text{ if } verticalSeq(i) = \text{'|'} \ \& thresholdSeq(i) < 0.5 \\ pushLRSeq = \text{'}R\text{'}, \text{ if } verticalSeq(i) = \text{'|'} \ \& thresholdSeq(i) > 0.5 \\ pushLRSeq = \text{'.'}, \text{ if } verticalSeq(i) = \text{'|'} \ \& thresholdSeq(i) = 0.5 \end{cases}$$

$$\begin{cases} pushURSeq = \text{'}L\text{'}, \text{ if } horizontalSeq(i) = \text{'\_'} \ \& thresholdSeq(i) < 0.5 \\ pushURSeq = \text{'}R\text{'}, \text{ if } horizontalSeq(i) = \text{'\_'} \ \& thresholdSeq(i) > 0.5 \\ pushURSeq = \text{'.'}, \text{ if } horizontalSeq(i) = \text{'\_'} \ \& thresholdSeq(i) = 0.5 \end{cases}$$

$$\begin{cases} resultLR = getFinalState(pushLRSeq) \\ resultUR = getFinalState(pushURSeq) \end{cases}$$

Figure 5:
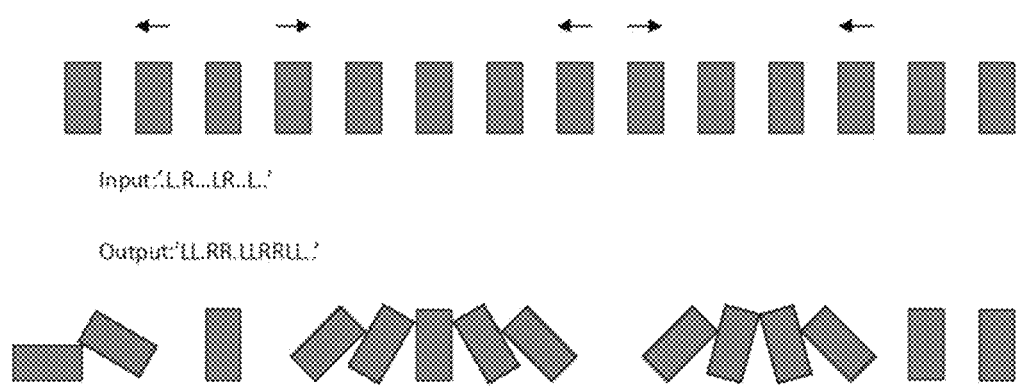
FIG. 5 is an exemplary diagram of the domino tile overturn issue.

The divideDominoes function is used to determine a result after the four-grid puzzle represented by the mask sequence is segmented according to FIG. 3, and the getFinalState function is used to solve a state after the dominos represented by the simulation sequence are overturned. FIG. 5 is an example of the domino overturn issue. The decimal image matrix Y3 of r×c is then convened into a binary binary matrix bita of r×(c×B), the rows and columns of the matrix bita are shifted by circshift function to obtain a binary matrix bitb, and the bitb is converted into a decimal matrix Y4:

$$\begin{cases} cntL = cntL + 1, \text{ if } resultLR(i) = \text{'}L\text{'} \\ cntR = cntR + 1, \text{ if } resultLR(i) = \text{'}R\text{'} \end{cases}$$

$$\begin{cases} bitb(i, :) = circshift(bita(i, :), -cntL, 2) \\ bitb(i + 1, :) = circshift(bitb(i + 1, :), cntL, 2) \end{cases}$$

$$\begin{cases} cntU = cntU + 1, \text{ if } resultUD(i) = \text{'}L\text{'} \\ cntU = cntU + 1, \text{ if } resultUD(i) = \text{'}R\text{'} \end{cases}$$

$$\begin{cases} bitb(:, i) = circshift(bitb(:, i), -cntU, 1) \\ bitb(:, i + 1) = circshift(bitb(:, i + 1), cntD, 1) \end{cases}$$

Figure 6:
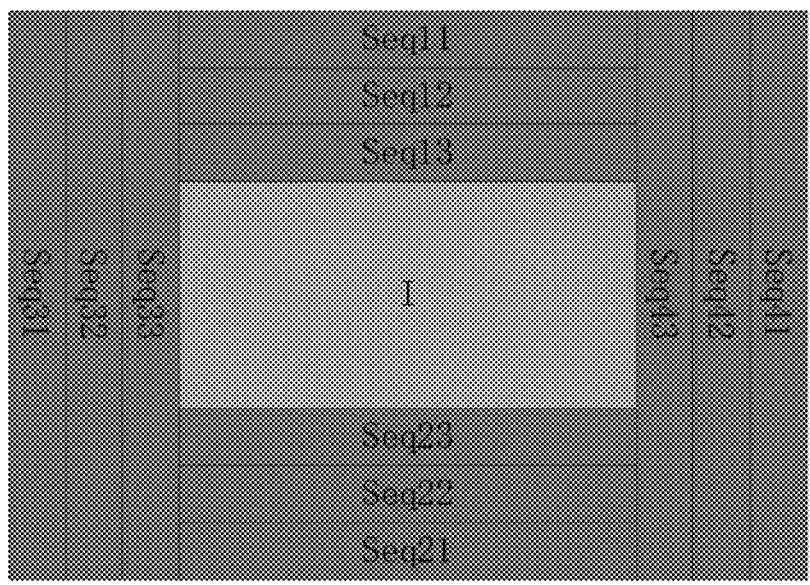
FIG. 6 is a schematic diagram of pre-treatment of a diffusion operation.

Step 11: in the diffusion process, the image matrix I (i.e. Y4) needs to be pre-processed to obtain Y5, as shown in FIG. 6. That is, random number sequences seq11-seq41 are added to the outer side of the image matrix to prevent overflow.

I=[seq31, seq32, seq33, [seq11; seq12; seq13; I; seq22; seq21], seq43, seq42, seq41]

Figure 7:
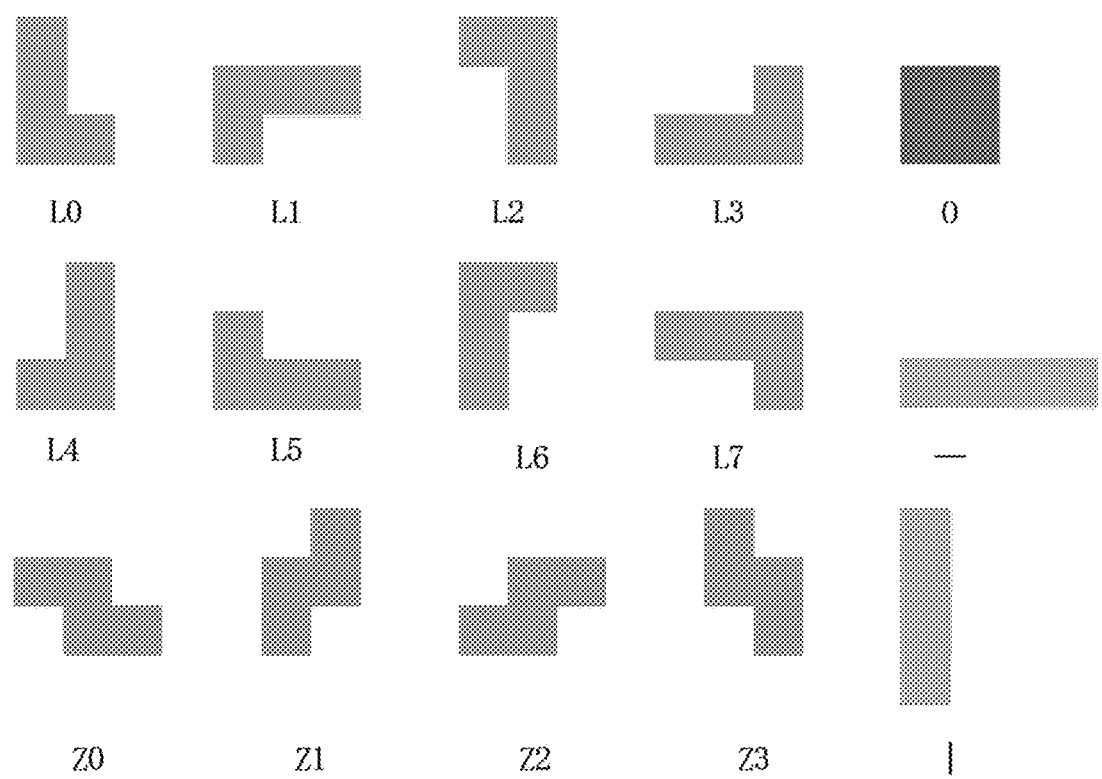
FIG. 7 is a schematic diagram of 15 types of mask shapes.

Then, the sequences v2 and w3 are used as mask sequences coveringSeq2 and coveringSeq3, and the four-grid puzzle in FIG. 2 is segmented to form 15 mask shapes in FIG. 7. Diffusion operation is performed on the pre-processed image matrix according to the mask shape, and the operation is defined as shape_bitxor, and three adjacent pixel, points of the pixel points I(i, j) are selected according to the parameter shape, and then a value I'(i', j') of the matrix I' at the i'th row and the j'th column is obtained.

$$\begin{cases} I'(i', j') = I(i, j) \oplus I(i, j+1) \oplus I(i+1, j) \oplus I(i+1, j+1); \\ \quad \text{if shape} = \text{'o'} \\ I'(i', j') = I(i, j) \oplus I(i, j+1) \oplus I(i, j+2) \oplus I(i, j+3); \\ \quad \text{if shape} = \text{'\_'} \\ I'(i', j') = I(i, j) \oplus I(i+1, j) \oplus I(i+2, j) \oplus I(i+3, j); \\ \quad \text{if shape} = \text{'|'} \\ I'(i', j') = I(i, j) \oplus I(i+1, j) \oplus I(i+2, j) \oplus I(i+2, j+1); \\ \quad \text{if shape} = \text{'L0'} \\ I'(i', j') = I(i, j) \oplus I(i, j-1) \oplus I(i, j-2) \oplus I(i-1, j-2); \\ \quad \text{if shape} = \text{'L1'} \\ I'(i', j') = I(i, j) \oplus I(i-1, j) \oplus I(i-2, j) \oplus I(i-2, j-1); \\ \quad \text{if shape} = \text{'L2'} \\ I'(i', j') = I(i, j) \oplus I(i, j+1) \oplus I(i, j+2) \oplus I(i-1, j+2); \\ \quad \text{if shape} = \text{'L3'} \\ I'(i', j') = I(i, j) \oplus I(i+1, j) \oplus I(i+2, j) \oplus I(i+2, j-1); \\ \quad \text{if shape} = \text{'L4'} \\ I'(i', j') = I(i, j) \oplus I(i, j-1) \oplus I(i, j-2) \oplus I(i-1, j-2); \\ \quad \text{if shape} = \text{'L5'} \\ I'(i', j') = I(i, j) \oplus I(i-1, j) \oplus I(i-2, j) \oplus I(i-2, j+1); \\ \quad \text{if shape} = \text{'L6'} \\ I'(i', j') = I(i, j) \oplus I(i, j+1) \oplus I(i, j+2) \oplus I(i+1, j+2); \\ \quad \text{if shape} = \text{'L7'} \\ I'(i', j') = I(i, j) \oplus I(i, j+1) \oplus I(i+1, j+1) \oplus I(i+1, j+2); \\ \quad \text{if shape} = \text{'Z0'} \\ I'(i', j') = I(i, j) \oplus I(i+1, j) \oplus I(i+1, j-1) \oplus I(i+2, j-1); \\ \quad \text{if shape} = \text{'Z1'} \\ I'(i', j') = I(i, j) \oplus I(i, j-1) \oplus I(i+1, j-1) \oplus I(i+1, j-2); \\ \quad \text{if shape} = \text{'Z2'} \\ I'(i', j') = I(i, j) \oplus I(i-1, j) \oplus I(i-1, j-1) \oplus I(i-2, j-1); \\ \quad \text{if shape} = \text{'Z3'} \end{cases}$$

shape_bitxor diffusion operation is performed on the pre-processed image matrix Y5 to obtain Y6. Further modulo operation is performed on Y6 to obtain Y7

$$\begin{cases} Y7(i-3, j-3) = \text{mod}(S1(i-3, j-3) + Y6(i-3, j-3).256), \\ \quad \text{if } i = 4, j-4 \\ Y7(i-3, j-3) = \text{mod}(Y7(i-4, n5-6) + S1(i-3, j-3) + \\ \quad Y6(i-3, j-3), 256, \text{if } i \neq 4, j = 4 \\ Y7(i-3, j-3) = \text{mod}(Y7(i-3, j-4) + S1(i-3, j-3) + \\ \quad Y6(i-3, j-3), 256), \text{else} \end{cases}$$

where n5 represents a quantity of columns of the pre-processed image matrix; (i-3, j-3) indicates the i-3th row and j-3th column; (i-4, n5-6) indicates the i-4th row and the n5-6th column.

Step 12: Y8 is obtained by moduloing Y7.

$Y8(i)=\text{mod}(Y8(i+1)+S2(i)+Y7(i),256)$

Step 13: first, a rank of non-negative matrix decomposition is set to 256, and the sequences v56, w56 are used to obtain the initial iteration matrces Winit, Hinit.

$$\begin{cases} \text{Wintit} = \text{reshape } (v56, 256, 256) \\ \text{Hintit} = \text{reshape } (w56, 256, 256) \end{cases}.$$

The carrier image matrix is then divided into blocks of $B_3 \times B_3$, and the secret image matrix Y8, the initial iteration matrix Winit, Hinit are divided into blocks of $$\left(\frac{B_3}{2} \times \frac{B_3}{2}\right).$$

Then integer wavelet decomposition is performed on the block matrix of the carrier image to obtain a block high-frequency coefficient matrix $HH_i$, and non-negative matrix decomposition is performed on the matrix $HH_i$ to obtain a matrix $W_i$, $H_i$. $[W_i, H_i]$=nmf($HH_i$, $Winit_i$, $Hinit_i$), Where nmf is a non-negative matrix decomposition function; then, for a matrix $H_i$, an orthogonal matrix is obtained, $OH_i$=orth $(H_i)$, and if $H_i$ is not a full rank, matrix, the rank of the matrix needs to be changed, and the process is as follows;

svd is performed on the matrix $H_i$ first, [u, s, v]=svd($H_i$).

For singular values in a singular-valued matrix s, if the condition $s(i,j) < 1^{-10}$ is satisfied, the elements in s are assigned to a new matrix s', and let s'(i,j)=s(i-1, j-1), and then a new sub-matrix $H_i$' is obtained by matrix multiplication, $H_i'$=u×s'×$v^T$, where $v^T$ is a transposed matrix of v.

In the next step, the block matrix information of the secret image is embedded into the sub-matrix $W_i$ using the addition criterion to obtain $W_i'$. $W_i'$=$W_i$+α×secImg$_i$, where secImg$_i$ is the secret image block matrix and α is the embedding strength; then the block high-frequency coefficient matrix $HH_i'$ with embedded information is obtained, $HH_i'$=$W_i'$× $OH_i$, the block high-frequency coefficient matrix $HH_i'$ is combined to obtain the matrix HH', and finally the final ciphertext image is obtained by inverse integer wavelet transform.

The present disclosure proposes an image encryption method based on adaptive compressed sensing and non-negative matrix decomposition, which is mainly divided into two stages. In the first stage, after the plain image is thinned by Tetrolet transform, the image is compressed by the process of adaptive block compressed sensing, and then the image is encrypted into a noise-like secret image by the proposed scrambling and diffusion method. In the second stage, the secret image is embedded into the high-frequency coefficients of the carrier image by non-negative matrix decomposition, and the meaningful ciphertext image is obtained. The present disclosure is simulated in MATLAB R2016a, and the running environment is Win10 IntelCore 15-10500, ARM 16.0 GB, and it is shown through Tables 1-4 that the encryption and decryption effects obtained by this embodiment are superior to the experimental effects of other methods.

TABLE 1

| | PSNR and MSSIM values of simulation results | | | | |
|---|---|---|---|---|---|
| Plaintext image | Carrier image | Ciphertext image PSNR (dB) | Ciphertext image MSSIM | Decrypted image PSNR (dB) | Decrypted image MSSIM |
| Lena | Private | 32.0495 | 0.9997 | 32.4778 | 0.9606 |
| Woman | Mandril | 32.0290 | 0.9998 | 32.5132 | 0.9081 |
| Cameraman | Livingroom | 32.2501 | 0.9997 | 32.1999 | 0.9637 |
| Peppers | Lake | 31.7729 | 0.9996 | 30.8927 | 0.9601 |

TABLE 2

Correlation coefficient of plaintext image and secret image

| Image | Horizontal | Vertical | Diagonal |
|---|---|---|---|
| Lena | | | |
| Plaintext image | 0.9850 | 0.9718 | 0.9594 |
| Secret image | −0.0035 | 0.0003 | 0.0016 |
| Woman | | | |
| Plaintext image | 0.9969 | 0.9963 | 0.9946 |
| Secret image | −0.0027 | −0.0028 | 0.0016 |
| Cameraman | | | |
| Plaintext image | 0.9900 | 0.9832 | 0.9731 |
| Secret image | −0.0049 | 0.0008 | 0.0023 |
| Peppers | | | |
| Plaintext image | 0.9794 | 0.9773 | 0.9643 |
| Secret image | 0.0004 | 0.0069 | −0.0011 |

TABLE 3

Plaintext sensitivity test

| Image | Pixel change | NPCR | UACI | Results |
|---|---|---|---|---|
| Lena | P(512, 512) = 108->109 | 99.6002% | 33.5644% | Pass |
| Woman | P(512, 512) = 148->149 | 99.6277% | 33.5380% | Pass |
| Cameraman | P(512, 512) = 111->110 | 99.6063% | 33.4876% | Pass |
| Livingroom | P(512, 512) = 159->158 | 99.6323% | 33.3846% | Pass |
| Mandril | P(512, 512) = 89->88 | 99.6231% | 33.4854% | Pass |

TABLE 4

Values of secret images

| Image | Values | Results |
|---|---|---|
| Lena | 248.9375 | Pass |
| Woman | 260.4141 | Pass |
| Cameraman | 235 | Pass |
| Peppers | 246.7734 | Pass |

While the principles and embodiments of the present disclosure have been described herein with reference to specific examples, the foregoing description of the embodiment has been presented only to aid in the understanding of the methods and key thoughts of the disclosure. At the same time, those of ordinary skill in the art will appreciate that many changes can be made in the specific embodiments and application ranges of the present disclosure in light of the thoughts. In view of the foregoing content, the description should not be construed as limiting the disclosure.

What is claimed is:

1. A method for encrypting a visually secure image, comprising the steps of generating parameters and initial values of a six-dimensional hyperchaotic system and a hybrid chaotic system according to plaintext image information;

generating a chaotic sequence by iteration of the six-dimensional hyperchaotic system, and constructing a random sequence using the generated chaotic sequence;

performing Tetrolet transformation on the plaintext image to generate a coefficient matrix and performing optimized matrix scrambling for the coefficient matrix;

regarding a scrambled coefficient matrix, calculating a quantity of samplings allocated to each block after the coefficient matrix is divided into blocks according to a block sampling strategy based on region energy;

generating the chaotic sequence by iteration of the hybrid chaotic system, conducting an initial measurement matrix using the generated chaotic sequence, and obtaining a final measurement matrix by optimizing and normalizing the initial measurement matrix;

according to the block compressed sensing theory, using the block measurement matrix to measure a corresponding block coefficient matrix, and obtaining the measurement value matrix;

quantizing the measurement value matrix to obtain a quantized measurement value matrix;

scrambling a quantized measurement value matrix at pixel level by scrambling method based on domino tile issue, and obtaining the measurement value matrix after a first scrambling;

scrambling the measurement value matrix at pixel level after the first scrambling by the scrambling method based on domino overturn issue, and obtaining the measurement value matrix after a second scrambling;

diffusing the measurement value matrix after the second scrambling using a diffusion method based on a four-grid puzzle to obtain a diffused measurement value matrix, and performing a reverse diffusion operation on the diffused measurement value matrix to obtain a secret image matrix;

embedding the secret image matrix into a carrier image using non-negative matrix decomposition to obtain a ciphertext image.

2. The method for encrypting a visually secure image according to claim 1, wherein generating parameters and initial values of a six-dimensional hyperchaotic system and a hybrid chaotic system according to plaintext image information is specifically generating in a manner that:

first, an SHA512 function is used to generate a 512-bit hash value K for plaintext image:

$K=SHA512(img)$ it is converted into 64 decimal numbers with a set of 8 bits, denoted as array k, to obtain matrices k11-k62 and k7 via k and the calculation process is as follows:

$$\begin{cases} k11 = \text{reshape}\,(k(1{:}6), 3, 2) \\ k12 = \text{reshape}\,(k(7{:}10), 2, 2) \\ k21 = \text{reshape}\,(k(11{:}16), 3, 2) \\ k22 = \text{reshape}\,(k(17{:}20), 2, 2) \\ k31 = \text{reshape}\,(k(21{:}26), 3, 2) \\ k32 = \text{reshape}\,(k(27{:}30), 2, 2) \\ k41 = \text{reshape}\,(k(31{:}36), 3, 2) \\ k42 = \text{reshape}\,(k(37{:}40), 2, 2) \\ k51 = \text{reshape}\,(k(41{:}46), 3, 2) \\ k52 = \text{reshape}\,(k(47{:}50), 2, 2) \\ k61 = \text{reshape}\,(k(51{:}56), 3, 2) \\ k62 = \text{reshape}\,(k(57{:}60), 2, 2) \\ k7 = (k(61{:}64)) \end{cases}$$

for 141-k62, the calculation process is performed in the following manner that:

$$\begin{cases} kr1 = KR(k11, k12) \\ kr2 = KR(k21, k22) \\ kr3 = KR(k31, k32) \\ kr4 = KR(k41, k42) \\ kr5 = KR(k51, k52) \\ kr6 = KR(k61, k62) \end{cases}$$

KR is used to calculate the Khatri-Rao product: of the two matrices:

k7 is used to respectively calculate with kr1-kr6: the Kronecker product of k7 and kr1 is calculated to achieve a matrix kro71 of 6×8, an average value of kro71 is recorded as Mkro71, kro71 is converted into a one-dimensional matrix kro71', and Mkro71 is added to an end of the one-dimensional matrix kro71' to form a matrix kro71" of 1×49 which is rearranged into a matrix kro71''' of 7×7:

$$\begin{cases} kro71 = kron(k7, kr1) \\ kro71' = \text{reshape}(kro71, 1, 48) \\ kro71'' = [kro71', Mkro71] \\ kro71''' = \text{reshape}(kro71'', 7, 7) \end{cases}$$

the diagonal matrix s1 with singular values is obtained by singular value decomposition svd of kro71''', and the mean value me1 of s1 is used to obtain key1;

$$\begin{cases} [u1, s1, v1] = svd(kro71''') \\ key1 = \text{mod}(me1/10^7, 1) \end{cases}$$

key2-key6 are obtained according to the operation mode of k7 and kr1, key1, key2, key3, key4, key S, key6 constitute a set of keys that is able to be used as initial values $x_0$, $y_0$, $z_0$, $u_0$, $v_0$, $w_0$ of the six-dimensional hyperchaotic system;

the array k previously generated by the hash value of the plaintext image is used to obtain the matrix k1-k4

$$\begin{cases} k1 = \text{reshape}(k(1:16), 4, 4) \\ k2 = \text{reshape}(k(17:32), 4, 4) \\ k3 = \text{reshape}(k(33:48), 4, 4) \\ k4 = \text{reshape}(k(49:64), 4, 4) \end{cases}$$

Hadamard product of k1 and k4 is calculated to obtain k14, and the Hadamard product of k2 and k3 is calculated to obtain k23:

$$\begin{cases} k14 = k1.*k4 \\ k23 = k2.*k3 \end{cases}$$

$$\begin{cases} [u14, s14, v14] = svd(k14) \\ [u23, s23, v23] = svd(k23) \end{cases}$$

two diagonal matrices s14 and s23 with singular values are obtained by singular value decomposition svd for k14 and k23, respectively, and Key14 and key23 are obtained as the parameters $r_0$ and initial value $xx_0$ of the mixed chaotic system by means of the mean values me14 and me23 in s14 and s23:

$$\begin{cases} key14 = 1.4 + \text{mod}(me14/10^4, 2.6) \\ key23 = \text{mod}(me23/10^4, 1) \end{cases}$$

3. The method for encrypting a visually secure image according to claim 2, wherein generating a chaotic sequence by iteration of the six-dimensional hyperchaotic system, and constructing a random sequence using the generated chaotic sequence is specifically performed in a manner that:

a size of image matrix is set to M'×N', a total quantity of pixels is num, and sampling interval of the chaotic sequence is d;

firstly, an initial value $x_0$, $y_0$, $z_0$, $u_0$, $v_0$, $w_0$ of the six-dimensional hyperchaotic system is substituted into the six-dimensional hyperchaotic system and iteration is performed for num×d times to generate six corresponding chaotic sequences xn, yn, zn, un, vn, wn, and the six chaotic sequences are respectively sampled using d to obtain corresponding sub-sequences;

$$\begin{cases} x1 = \text{floor}(\text{abs}(xn(1:d:\text{end}-d+1)*100)+1) \\ x2 = \text{mod}(\text{floor}(\text{abs}(xn(2:d:\text{end}-d+2)*100)+1), 256) \\ x3 = \text{mod}(\text{floor}(\text{abs}(xn(3:d:\text{end}-d+3)*100)+1), 256) \\ x4 = \text{mod}(\text{floor}(\text{abs}(xn(4:d:\text{end}-d+4)*100)+1), 256) \end{cases}$$

$$\begin{cases} y1 = \text{floor}(\text{abs}(yn(1:d:\text{end}-d+1)*100)+1) \\ y2 = \text{mod}(\text{floor}(\text{abs}(yn(2:d:\text{end}-d+2)*100)+1), 256) \\ y3 = \text{mod}(\text{floor}(\text{abs}(yn(3:d:\text{end}-d+3)*100)+1), 256) \\ y4 = \text{mod}(\text{floor}(\text{abs}(yn(4:d:\text{end}-d+4)*100)+1), 256) \end{cases}$$

$$\begin{cases} z1 = \text{floor}(\text{mod}(\text{abs}(zn(1:d:\text{end}-d+1)*100), 100+1) \\ z2 = \text{mod}(\text{floor}(\text{abs}(zn(2:d:\text{end}-d+2)*100)+1), 256) \\ z3 = \text{mod}(\text{floor}(\text{abs}(zn(3:d:\text{end}-d+3)*100)+1), 256) \\ z4 = \text{mod}(\text{floor}(\text{abs}(zn(4:d:\text{end}-d+4)*100)+1), 256) \end{cases}$$

$$\begin{cases} u1 = \text{floor}(\text{mod}(\text{abs}(un(1:d:\text{end}-d+1)*5), 9)+1) \\ u2 = \text{mod}(\text{floor}(\text{abs}(un(2:d:\text{end}-d+2)*100)+1), 256) \\ u3 = \text{mod}(\text{floor}(\text{abs}(un(3:d:\text{end}-d+3)*100)+1), 256) \\ u4 = \text{mod}(\text{floor}(\text{abs}(un(4:d:\text{end}-d+4)*100)+1), 256) \end{cases}$$

$$\begin{cases} v1 = \text{floor}(\text{mod}(\text{abs}(vn(1:d:\text{end}-d+1)*100), 16, +1) \\ v2 = \text{floor}(\text{mod}(\text{abs}(vn(2:d:\text{end}-d+2)*100), 16, +1) \\ v3 = \text{floor}(\text{abs}(vn(3:d:\text{end}-d+3)*100), +1) \\ v4 = \text{floor}(\text{abs}(vn(4:d:\text{end}-d+4)*100), +1) \\ v5 = \text{mod}(\text{abs}(vn(5:d*2:\text{end})), 1) \\ v6 = \text{mod}(\text{abs}(vn(6:d*2:\text{end})), 1) \\ v56[v5, v6] \end{cases}$$

$$\begin{cases} w1 = \text{floor}(\text{abs}(wn(1:d:\text{end}-d+1)*100)+1) \\ w2 = \text{floor}(\text{abs}(wn(2:d:\text{end}-d+2)*100)+1) \\ w3 = \text{floor}(\text{mod}(\text{abs}(wn(3:d:\text{end}-d+3)*100), 4)+1) \\ w4 = \text{floor}(\text{abs}(wn(4:d:\text{end}-d+4)*100)+1) \\ w5 = \text{mod}(\text{abs}(wn(5:d*2:\text{end})), 1) \\ w6 = \text{mod}(\text{abs}(wn(6:d*2:\text{end})), 1) \\ w56 = [w5, w6] \end{cases}$$

the sub-sequences w1, w2, w4, v3, y4 are quantized between [0,1]:

$$\begin{cases} w1(i) = 1.0/(1 + \exp(w1(i))), i = 1, 2 \ldots num \\ w2(i) = 1.0/(1 + \exp(w2(i))), i = 1, 2 \ldots num \\ w4(i) = 1.0/(1 + \exp(w4(i))), i = 1, 2 \ldots num \\ v3(i) = 1.0/(1 + \exp(v3(i))), i = 1, 2 \ldots num \\ v4(i) = 1.0/(1 + \exp(v4(i))), i = 1, 2 \ldots num \end{cases}$$

a threshold sequence thresholdSeq obtained by quantizing the sequence between [0,1] above is used for a bit-level scrambling process:

$$\begin{cases} w11 = \mod(w1 + w4, 1) \\ w12 = \mod(ones(1, num) + w1 - w4, 1) \\ w21 = \mod(w2 + w4, 1) \\ w22 = \mod(ones(1, num) + w2 - w4, 1) \\ v31 = \mod(v3 + w4, 1) \\ v32 = \mod(ones(1, num) + v3 - w4, 1) \\ v41 = \mod(v4 + w4, 1) \\ v42 = \mod(ones(1, num) + v4 - w4, 1) \\ thresholdSeq = [w11, w21, v31, v41, w12, w22, v32, v42] \end{cases}$$

where the ones ( ) function is used to construct the all-ones matrix, and then 12 random number sequences seq11-seq43 are constructed for a diffusion process to be inserted to an outer side of the image matrix:

$$\begin{cases} seq11 = x2(1:M':end) \\ seq12 = y3(1:M':end) \\ seq13 = z4(1:M':end) \end{cases}$$

$$\begin{cases} seq21 = y2(1:M':end) \\ seq22 = z3(1:M':end) \\ seq23 = u4(1:M':end) \end{cases}$$

$$\begin{cases} seq31 = [z2(1:N':end), z2((2:7)]' \\ seq32 = [u3(1:N':end), u3((3:8)]' \\ seq33 = [x4(1:N':end), x4((4:9)]' \end{cases}$$

$$\begin{cases} seq41 = [u2(1:N':end), u2((2:7)]' \\ seq42 = [x3(1:N':end), x3((3:8)]' \\ seq43 = [y4(1:N':end), y4((4:9)]' \end{cases}$$

rotSeq1, rotSeq2 and chSeq are constructed for diffusion process:

$$\begin{cases} rotSeq1 = \mod(x2(2:N':end - N'), 3) + 1 \\ rotSeq2 = \mod(y2(2:N':end - N'), 3) + 1 \\ chSeq = \mod(z2(2:N':end), 3) + 1 \end{cases}$$

sequences S1 and S2 are then constructed for diffusing the image matrix:

$$\begin{cases} S11 = x3(3:8:end) \\ S12 = y3(3:8:end) \\ S13 = z3(3:8:end) \\ S14 = u3(3:8:end) \\ S15 = x4(3:8:end) \\ S16 = y4(3:8:end) \\ S17 = z4(3:8:end) \\ S18 = u4(3:8:end) \end{cases}$$

$$\begin{cases} S1(i) = S11\left(\frac{i-1}{8} + 1\right), i = 1, 9, 17 \ldots M' * N' \\ S1(i+1) = S12\left(\frac{i-1}{8} + 1\right), i = 1, 9, 17 \ldots M' * N' \\ S1(i+2) = S13\left(\frac{i-1}{8} + 1\right), i = 1, 9, 17 \ldots M' * N' \\ S1(i+3) = S14\left(\frac{i-1}{8} + 1\right), i = 1, 9, 17 \ldots M' * N' \\ S1(i+4) = S15\left(\frac{i-1}{8} + 1\right), i = 1, 9, 17 \ldots M' * N' \\ S1(i+5) = S16\left(\frac{i-1}{8} + 1\right), i = 1, 9, 17 \ldots M' * N' \\ S1(i+6) = S17\left(\frac{i-1}{8} + 1\right), i = 1, 9, 17 \ldots M' * N' \\ S1(i+7) = S18\left(\frac{i-1}{8} + 1\right), i = 1, 9, 17 \ldots M' * N' \end{cases}$$

$$\begin{cases} S21 = x3(4:8:end) \\ S22 = y3(4:8:end) \\ S23 = z3(4:8:end) \\ S24 = u3(4:8:end) \\ S25 = x4(4:8:end) \\ S26 = y4(4:8:end) \\ S27 = z4(4:8:end) \\ S28 = u4(4:8:end) \end{cases}$$

$$\begin{cases} S2(i) = S21\left(\frac{i-1}{8} + 1\right), i = 1, 9, 17 \ldots M' * N' \\ S2(i+1) = S22\left(\frac{i-1}{8} + 1\right), i = 1, 9, 17 \ldots M' * N' \\ S2(i+2) = S23\left(\frac{i-1}{8} + 1\right), i = 1, 9, 17 \ldots M' * N' \\ S2(i+3) = S24\left(\frac{i-1}{8} + 1\right), i = 1, 9, 17 \ldots M' * N' \\ S2(i+4) = S25\left(\frac{i-1}{8} + 1\right), i = 1, 9, 17 \ldots M' * N' \\ S2(i+5) = S26\left(\frac{i-1}{8} + 1\right), i = 1, 9, 17 \ldots M' * N' \\ S2(i+6) = S27\left(\frac{i-1}{8} + 1\right), i = 1, 9, 17 \ldots M' * N' \\ S2(i+7) = S28\left(\frac{i-1}{8} + 1\right), i = 1, 9, 17 \ldots M' * N' \end{cases}$$

4. The method for encrypting a visually secure image according to claim 3, wherein regarding a scrambled coefficient matrix calculating a quantity of samplings allocated to each block after the coefficient matrix is divided into blocks according to a block sampling strategy based on region energy is specifically calculating in a manner that:

a size of a block region B, an image sampling rate SR and a weight matrix W are set, while a value of the size of B is set as 4, 8 and 16;

$$\begin{cases} W = [1, 2, 2, 1], \text{ if } B = 4 \\ W = [1, 1, 2, 2, 2, 2, 1, 1], \text{ if } B = 8 \\ W = [1, 1, 1, 1, 2, 2, 2, 2, 2, 2, 2, 2, 1, 1, 1, 1], \text{ if } B = 16 \end{cases}$$

the quantity of image blocks G and the quantity of samplings SF are calculated:

$$G = num1/B^2$$

$$SF = num1 \times SR$$

wherein num1 represents a quantity of elements of the scrambled coefficient matrix;
the image is divided into blocks and energy $E_i$ of pixels in the block region is calculated:

$$\begin{cases} E_i = sum(W' \times W. \times X_i./36), & \text{if } B = 4 \\ E_i = sum(W' \times W. \times X_i./144), & \text{if } B = 8 \\ E_i = sum(W' \times W. \times X_i./576), & \text{if } B = 16 \end{cases}$$

where $X_i$ is an image block;
energy occupancy rate $PE_i$ of each image block is calculated:

$$PE_i = abs(E_i)/\sum_{i=1}^{n} abs(E_i)$$

the quantity $AM_i$ of samplings per image block is calculated:

$$AM_i = PE_i \times SF, i = 1, 2 \ldots G$$

a matrix formed by the quantity of samplings of image blocks at corresponding positions is a sampling matrix AM of the whole image:

$$AM = \begin{pmatrix} AM_1 & \ldots & AM_{m/B} \\ \vdots & \ddots & \vdots \\ AM_{n/B} & \ldots & AM_G \end{pmatrix}$$

rounding is performed to obtain the actual quantity $AM_i'$ of samplings of the image blocks and the sampling matrix of the image AM':

$$AM_i' = round(PE_i \times SF), i = 1, 2 \ldots G$$

$$AM' = \begin{pmatrix} AM_1' & \ldots & AM_{m/B}' \\ \vdots & \ddots & \vdots \\ AM_{n/B}' & \ldots & AM_G' \end{pmatrix}$$

the AM' is sorted in an ascending order to obtain an index sequence, ind_AM:

$$[\sim, ind\_AM] = sort(AM')$$

a maximum element in AM' is adjusted to keep a total quantity of samplings unchanged:

$$AM'(ind\_AM(end)) = AM'(ind\_AM(end)) + round(sum(AM) - sum(AM_i')).$$

5. The method for encrypting a visually secure image according to claim 4, wherein generating the chaotic sequence by iteration of the hybrid chaotic system, conducting an initial measurement matrix using the generated chaotic sequence, and obtaining a final measurement matrix by optimizing and normalizing the initial measurement matrix is specifically performed in a manner that:

an image size is sit to M0×N0 such that the hybrid chaotic system is iterated for maxAM×M0×N0+t times according to a maximum quantity maxAM of samplings of the image blocks, and the initial measurement matrix chaosMat of (maxAM×M0)×N0 is generated with the remaining values after discarding the first t values; the initial measurement matrix chaosMat is optimized, to obtain an optimized measurement matrix Φ', and the optimization process is performed in a manner of:

setting a size B of the block region, dividing the image into blocks and calculating a sum of absolute values of pixel values within the block to obtain a matrix Sum, and arranging elements in the Sum in a descending order to obtain a ranking index value, which is denoted as Pos; adjusting the generated initial measurement matrix chaosMat to a matrix of M1×N1, wherein N1=num1/$B^2$ num1 represents a quantity of elements of the scrambled coefficient matrix: M1=Num'/N1, num' is a quantity of elements of the initial measurement matrix chaosMat; calculating a sum of a mean value and a median value of the absolute values of column vectors of the initial measurement matrix and assigning corresponding weights, so as to obtain a sequence Sum1:

$$Sum1(i) = w_1 \times sum(abs(chaosMat(:,i))) + w_2 \times median(abs(chaosMat(:,i)))$$

where $w_1$ and $w_2$ are weight coefficients;
Sum1 is sorted in a descending order to obtain an index sequence Pos1, and column vectors of the measurement matrix chaosMat of a corresponding size are rearranged according to a size of a pixel sum of an image block so as to obtain Φ;

$$\Phi(:,Pos(i)) = chaoMat(:,Pos1(i))$$

finally, normalization is performed to obtain an optimized measurement matrix Φ', and the normalization process is as follows:

$$\Phi' = \sqrt{\frac{2}{M}} \Phi.$$

6. The method for encrypting a visually secure image according to claim 5, wherein scrambling a quantized measurement value matrix at pixel level by scrambling method based on domino tile issue, and obtaining the measurement value matrix after a first scrambling is performed in a manner that firstly, the sub-sequences x1, y1 of the six-dimensional hyperchaotic system are modulo-operated to obtain x1', y1':

$$\begin{cases} x1' = mod(x1, 16) + 1 \\ y1' = mod(y1, 8) + 1 \end{cases}$$

taking each element in the sequence x1' as a serial number of the four-grid puzzle, mask segmentation is performed and encoding is performed using an encoding rule of the mask, a character sequence dominoesSeq containing '_' and 'l' is obtained; y' is taken as an index sequence for each character sequence dominoesSeq to be indexed, resulting in a flag bit flag with a value of 0 or 1 and finally a flag bit matrix Flags is be obtained:

$$\begin{cases} \text{Flags}(i) = 1, \text{ if } dominoesSeq(y1'(i)) = \text{`}|\text{'} \\ \text{Flags}(i) = 0, \text{ if } dominoesSeq(y1'(i)) = \text{`}\_\text{'} \end{cases}$$

according to the theory of domino tile issue, two sequences of Num2 and Num3 are obtained, in which Num2 and Num3 are the sequences composed of the method quantities corresponding to domino tile issue without considering the 2×N and 3×N of domino shape when the length N of rectangle in domino tile issue is set to 0-255;

Next, the following matrices are initialized: Initial, Full, Finish, Flags1, S; Initial represents an initial value of an image matrix, Full is a target value to be reached by each element in the image matrix, Finish is a result of scrambling the image matrix, Flags1 is a flag matrix used for recording a position of an element in the image matrix where scrambling has been completed, and S is an index matrix used for determining a position of a next element to be found by the current matrix element;

the sequences z1, u1 of the six-dimensional hyperchaotic system are rearranged to obtain a matrices z1' and u1' having the same dimensions as the image matrix, and then the length N of the rectangle in the domino tile issue is determined:

$$N = u1'(i,j)$$

u1'(i, j) representing the elements of the matrix u1' in the ith row and the jth column;

the matrices Full and S are constructed as follows that:

$$\begin{cases} n = 2, \text{Full}(i, j) = Num2(N+1); \text{ if } \mod(z1'(i, j), 2) = 0 \\ n = 3, \text{Full}(i, j) = Num3(N+1); \text{ else} \end{cases}$$

$$\begin{cases} S(i, j) = z1'(i, j), \\ \quad \text{if } z1'(i, j) \text{ satisfying one of nine special conditions} \\ S(i, j) = dominoesTile(n, N, z1'(i, j), \text{Flags}(i, j)), \text{ else} \end{cases}$$

where dominoesTile is a function for solving a corresponding issue in the case of considering the shape of a domino tile; and n represents a width of rectangle in domino tile issue;

The nine special cases are provided as follows that:

$$\begin{cases} z1'(i, j) \times 2 > n \times N \\ n = 3 \ \& \ \text{Flags}(i, j) = 0 \ \& \ \left(N \times \frac{3}{2} - z1'(i, j)\right) \mod 2 \neq 0 \\ n = 3 \ \& \ \text{Flags}(i, j) = 0 \ \& \ (z1'(i, j) \times 2 - N) < 0 \\ N < z1'(i, j) \\ n = 3 \ \& \ N \mod 2 \neq 0 \\ n = 3 \ \& \ \text{Flags}(i, j) = 1 \ \& \ z1'(i, j) \mod 2 \neq 0 \\ n = 3 \ \& \ \text{Flags}(i, j) = 0 \ \& \ (N - z1'(i, j)) \mod 2 \neq 0 \\ n = 2 \ \& \ \text{Flags}(i, j) = 0 \ \& \ z1'(i, j) \mod 2 \neq 0 \\ n = 2 \ \& \ \text{Flags}(i, j) = 1 \ \& (N - z1'(i, j)) \mod 2 \neq 0 \end{cases};$$

image matrix elements are scrambled using an index matrix S: the image matrix I and the index matrix S are respectively expanded into sequences I' and S', while each time a half of the length len of the sequence I' is taken as a starting point start, an element s' at the corresponding position in S' is taken as an index value, the element i' at ((start+s') mod len) in I' is taken and added, to the end of a new sequence E, and the position of the element i' is taken as a new starting point start;

and the above-mentioned process is continuously repeated until all the elements in I' are scrambled;

the above-mentioned scrambling process is repeated at most twice, and after each scrambling, screening is performed once under the following conditions:

$$\text{Finish}(i,j) = E(i,j), \text{ if } \text{Initial}(i,j) + roundCount \times E(i,j) \geq \text{Full}(i,j)$$

where roundCount is a quantity of scrambled rounds;

in addition, the length N of the rectangle and, the index matrix S in the domino tile issue are updated once:

$$\begin{cases} pos = (((NZCols(i) - 1) \times m + NZRows(i)) \times roundCount \mod len1) + 1 \\ N = u1'(pos) \\ S(i) = z1'(pos), \text{ if } z1'(pos) \text{ satisfying one of nine special conditions} \\ S(i) = dominoesTile(n, N, z1'(pos), \text{Flags}(pos)), \text{ else} \end{cases}$$

m is a row dimension of the image matrix, len1 is a length of z1', NZRows and NZCols are respectively arrays composed of rows and columns in Flags1 matrix of non-zero elements in the Flags1; the sequence composed of remaining elements after screening is restE, and if the remaining elements after two scrambling processes fail to complete the scrambling, the remaining elements are put into remaining positions respectively, and the whole scrambling process ends.

7. The method for encrypting a visually secure image according to claim 6, wherein scrambling the measurement value matrix at pixel level after the first scrambling by the scrambling method based on domino overturn issue, and obtaining the measurement value matrix after a second scrambling is specifically performed in a manner that:

taking sub-sequence v1 of the six-dimensional hyperchaotic system as a mask sequence coveringSeq1, threshold sequence thresholdSeq is used to generate index sequences resultLR, resultUD for binary shifting;

dominoes=divideDominoes(coveringSeq1)

$$\begin{cases} horizontalSeq(i) = \text{`}\_\text{'}, \text{ if } dominoes(i) = \text{`}\_\text{'} \\ horizontalSeq(i) = \text{`}.\text{'}, \text{ else} \end{cases}$$

$$\begin{cases} verticalSeq(i) = \text{`}.\text{'}, \text{ if } dominoes(i) = \text{`}\_\text{'} \\ verticalSeq(i) = \text{`}|\text{'}, \text{ else} \end{cases}$$

$$\begin{cases} pushLRSeq = \text{`L'}, \text{ if } verticalSeq(i) = \text{`}|\text{'} \ \& \ thresholdSeq(i) < 0.5 \\ pushLRSeq = \text{`R'}, \text{ if } verticalSeq(i) = \text{`}|\text{'} \ \& \ thresholdSeq(i) > 0.5 \\ pushLRSeq = \text{`}.\text{'}, \text{ if } verticalSeq(i) = \text{`}|\text{'} \ \& \ thresholdSeq(i) = 0.5 \end{cases}$$

$$\begin{cases} pushUDSeq = \text{`L'}, \text{ if } horizontalSeq(i) = \text{`}\_\text{'} \ \& \ thresholdSeq(i) < 0.5 \\ pushUDSeq = \text{`R'}, \text{ if } horizontalSeq(i) = \text{`}\_\text{'} \ \& \ thresholdSeq(i) > 0.5 \\ pushUDSeq = \text{`}.\text{'}, \text{ if } horizontalSeq(i) = \text{`}\_\text{'} \ \& \ thresholdSeq(i) = 0.5 \end{cases}$$

$$\begin{cases} resultLR = getFinalState(pushLRSeq) \\ resultUD = getFinalState(pushUDSeq) \end{cases}$$

the divideDominoes function is used to determine a result after the four-grid puzzle represented by the mask sequence is segmented, and the getFinalState function is used to solve a state after the dominos represented by the simulation sequence are overturned, the decimal image matrix Y3 of r×c is then converted into a binary binary matrix bita of r×(c×8), the rows and columns of the matrix bita are shifted by a circshift function to obtain a binary matrix bitb, and the bitb is converted into a decimal matrix:

$$\begin{cases} cntL = cntL + 1, \text{ if } resultLR(i) = \text{'}L\text{'} \\ cntR = cntR + 1, \text{ if } resultLR(i) = \text{'}R\text{'} \end{cases}$$

$$\begin{cases} bitb(i,:) = circshift(bita(i,:), -cntL, 2) \\ bitb(i+1,:) = circshift(bitb(i+1,:), cntR, 2) \end{cases}$$

$$\begin{cases} cntU = cntU + 1, \text{ if } resultUD(i) = \text{'}L\text{'} \\ cntD = cntD + 1, \text{ if } resultUD(i) = \text{'}R\text{'} \end{cases}$$

$$\begin{cases} bitb(:,i) = circshift(bitb(:,i), -cntU, 1) \\ bitb(:,i+1) = circshift(bitb(:,i+1), cntD, 1) \end{cases}.$$

8. The method for encrypting a visually secure image according to claim 7, wherein diffusing the measurement value matrix after the second scrambling using a diffusion method based on a four-grid puzzle to obtain a diffused measurement value matrix, and performing a reverse diffusion operation on the diffused measurement value matrix to obtain a secret image matrix is specifically performed in a manner that:

In the diffusion process, the image matrix I pre-processed, i.e., random number sequences seq11-seq41 are added on an outside of the image matrix I to prevent overflow: 1=[seq31,seq32,seq33, [seq11;seq12;seq13;I; seq23; seq22;seq21], seq43,seq42,seq41]

then the sequences v2 and w3 are taken as mask sequences coveringSeq2 and coveringSeq3, the four-grid puzzle is segmented so as to form 15 types of mask shapes, diffusion operation is performed on the pre-processed image matrix according to the mask shape, the operation is defined as shape_bitxor, and three adjacent pixel points of the pixel points I(i, j) are selected according to the parameter shape, and then I'(i', j') is obtained;

$$\begin{cases} I'(i',j') = I(i,j) \oplus I(i,j+1) \oplus I(i+1,j) \oplus I(i+1,j+1); \\ \quad \text{if shape = 'o'} \\ I'(i',j') = I(i,j) \oplus I(ii,j+1) \oplus I(i,j+2) \oplus I(i,j+3); \\ \quad \text{if shape = '\_'} \\ I'(i',j') = I(i,j) \oplus I(i+1,j) \oplus I(i+2,j) \oplus I(i+3,j); \\ \quad \text{if shape = '|'} \\ I'(i',j') = I(i,j) \oplus I(i+1,j) \oplus I(i+2,j) \oplus I(i+2,j+1); \\ \quad \text{if shape = 'L0'} \\ I'(i',j') = I(i,j) \oplus I(i,j-1) \oplus I(i,j-2) \oplus I(i-1,j-2); \\ \quad \text{if shape = 'L1'} \\ I'(i',j') = I(i,j) \oplus I(i-1,j) \oplus I(i-2,j) \oplus I(i-2,j-1); \\ \quad \text{if shape = 'L2'} \\ I'(i',j') = I(i,j) \oplus I(i,j+1) \oplus I(i,j+2) \oplus I(i-1,j+2); \\ \quad \text{if shape = 'L3'} \\ I(i',j') = I(i,j) \oplus I(i+1,j) \oplus I(i+2,j) \oplus I(i+2,j-1); \\ \quad \text{if shape = 'L4'} \\ I'(i',j') = I(i,j) \oplus I(i,j-1) \oplus I(i,j-2) \oplus I(i-1,j-2); \\ \quad \text{if shape = 'L5'} \\ I'(i',j') = I(i,j) \oplus I(i-1,j) \oplus I(i-2,j) \oplus I(i-2,j+1); \\ \quad \text{if shape = 'L6'} \\ I'(i',j') = I(i,j) \oplus I(i,j+1) \oplus I(i,j+2) \oplus I(i+1,j+2)j; \\ \quad \text{if shape = 'L7'} \\ I'(i',j') = I(i,j) \oplus I(i,j+1) \oplus I(i+1,j+1) \oplus I(i+1,j+2); \\ \quad \text{if shape = 'Z0'} \\ I'(i',j') = I(i,j) \oplus I(i+1,j) \oplus I(i+1,j-1) \oplus I(i+2,j-1); \\ \quad \text{if shape = 'Z1'} \\ I'(i',j') = I(i,j) \oplus I(i,j-1) \oplus I(i+1,j-1) \oplus I(i+1,j-2); \\ \quad \text{if shape = 'Z2'} \\ I'(i',j') = I(i,j) \oplus I(i-1,j) \oplus I(i-1,j-1) \oplus I(i-2,j-1); \\ \quad \text{if shape = 'Z3'} \end{cases}$$

the matrix obtained after performing a shape_bitxor diffusion operation on the pre-processed image matrix is denoted as Y6, a modulo operation is further performed to obtain a matrix Y7, and finally a modulo operation is performed on Y7 to obtain a secret image matrix Y8:

$$\begin{cases} Y7(i-3, j-3) = \mod(S1(i-3, j-3) + Y6(i-3, j-3), 256), \\ \quad \text{if } i = 4, j = 4 \\ Y7(i-3, j-3) = \mod(Y7(i-4, n5-6) + S1(i-3, \\ \quad j-3) + Y6(i-3, j-3), 256), \text{ if } i \neq 4, j = 4 \\ Y7(i-3, j-3) = \mod(Y7(i-3, j-4) + S1(i-3, \\ \quad j-3) + Y6(i-3, j-3), 256), \text{ else} \end{cases}$$

$$Y8(i) = \mod(Y8(i+1) + S2(i) + Y7(i), 256)$$

where n5 represents a quantity of columns of the pre-processed image matrix; (i-3, j-3) indicates the i-3th row and j-3th column; (i-4, n5-6) indicates the i-4th row and the n5-6th column.

9. The method for encrypting a visually secure image according to claim 8, wherein embedding the secret image matrix, into a carrier image using non-negative matrix decomposition to obtain a ciphertext image is specifically performed in a manner that: a rank of non-negative matrix decomposition is set to 256, and sub-sequences v56, w56 are used to obtain the initial iteration matrices Winit, Hinit;

$$\begin{cases} Winit = reshape(v56, 256, 256) \\ Hinit = reshape(w56, 256, 256) \end{cases}$$

then the carrier image matrix is divided into $B_3 \times B_3$ blocks, the secret image matrix Y8 and the initial iteration matrices Winit and Hinit are divided into $$\left(\frac{B_3}{2} \times \frac{B_3}{2}\right)$$

blocks, then integer wavelet decomposition is performed on the block matrix of the carrier image to obtain a block high-frequency coefficient matrix $HH_i$, and non-negative matrix decomposition is performed on the matrix $HH_i$ to obtain a matrix $W_i$, $H_i$:

$$[W_i, H_i] = nmf(HH_i, Winit_i, Hinit_i)$$

where nmf is a non-negative matrix decomposition function;

Then for the matrix $H_i$, its orthogonal matrix is found:

$$OH_i = \text{orth}(H_i)$$

if $H_i$ is not a full rank matrix, the rank of the matrix is changed in a manner as follows: Singular Value Decomposition svd is performed on matrix $H_i$ $$[u, s, v] = svd(H_i)$$

for singular values in a matrix s of singular values, if the condition is satisfied $$s(i,j) < 1^{-10}$$

then elements in s are assigned to a new matrix s', and $$s'(i,j) = s(i-1, j-1)$$

then a new sun-matrix $H_i'$ is obtained via matrix multiplication $$H_i'=u \times s' \times v^T$$

where $v^T$ is a transpose matrix of v;
in the next step, the block matrix information of the secret image is embedded into the sub-matrix $W_i$ using the addition criterion to obtain $W_i'$:

$$W_i'=W_i \alpha \times secImg_i$$

where $secImg_i$ is a block matrix of the secret image and $\alpha$ is an embedding strength;
then the block high-frequency coefficient matrix $HH_i'$ with embedded information is obtained:

$$HH_i'=W_i' \times OH_i$$

the block high-frequency coefficient matrix $HH_i'$ is combined to obtain the matrix HH', and finally the final ciphertext image is obtained by inverse integer Wavelet transform.

* * * * *